United States Patent
Kikuchi

(10) Patent No.: US 8,503,887 B2
(45) Date of Patent: Aug. 6, 2013

(54) PRE-EQUALIZED OPTICAL TRANSMITTER AND PRE-EQUALIZED OPTICAL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 668 days.

(21) Appl. No.: 12/394,225

(22) Filed: Feb. 27, 2009

(65) Prior Publication Data

US 2009/0238580 A1    Sep. 24, 2009

(30) Foreign Application Priority Data

Mar. 19, 2008   (JP) ................................ 2008-071260

(51) Int. Cl.
*H04B 10/04*   (2006.01)
(52) U.S. Cl.
USPC .......................................... 398/188; 398/183
(58) Field of Classification Search
USPC ......................................................... 398/183
See application file for complete search history.

(56) References Cited

U.S. PATENT DOCUMENTS

| | | | | |
|---|---|---|---|---|
| 6,445,476 | B1 * | 9/2002 | Kahn et al. | 398/189 |
| 2004/0042802 | A1 * | 3/2004 | Ho et al. | 398/208 |
| 2006/0109939 | A1 * | 5/2006 | Ciccarelli et al. | 375/350 |
| 2006/0216039 | A1 * | 9/2006 | Kim et al. | 398/183 |

OTHER PUBLICATIONS

R. Killey, Dispersion and Nonlinearity Compensation using Electronic Predistortion Techniques, Optical Fibre Communications and Electronic Signal Precessing, The IEE Seminar on Ref. No. 2005-11310, 2005.
P.M. Watts, Performance of Electronic Predistortion Systems with 1 Sample/bit Processing using Optical Duobinary Format, paper Tu.3.1.6, ECOC, 2007.
M.M. El Said, An Electrically Pre-Equalized 10-Gb/s Duobinary Transmission System, Journal of Lightwave Technology, vol. 23, No. 1, Jan. 2005.
D. Penninckx, Effect of Electrical Filtering of Duobinary Signals on the Chromatic Dispersion Transmission Limitations, ECOC '98, Sep. 1998, pp. 537-538, vol. 1.
S.K. Ibrahim et al., Performance of 20 Gb/s Quaternary Intensity Modulation Based on Binary or Duobinary Modulation in Two Quadratures With Unequal Amplitudes, IEEE Journal of Selected Topics in Quantum Electronics, Jul./Aug. 2006, pp. 596-602, vol. 12, No. 4.

* cited by examiner

*Primary Examiner* — Danny Leung
(74) *Attorney, Agent, or Firm* — Mattingly & Malur, PC

(57) ABSTRACT

A pre-equalized optical transmitter includes, a laser source; a duo-binary pre-coder circuit; a pre-equalization circuit for applying an inverse function of chromatic dispersion; at least two D/A converters; and an optical field modulator comprising at least two input terminals for an electric signal. The pre-equalized optical transmitter: converts, by the duo-binary pre-coder circuit, a digital information signal of a predetermined symbol time to be transmitted into a digital complex signal including one sampling point per symbol; equalizes, by the pre-equalization circuit, degradation in transmission of the digital complex signal; converts, by the D/A converters, the equalized digital complex signal into an analog signal; suppresses an analog signal leaking outside a Nyquist bandwidth by at least 23 dB; modulates, by the optical field modulator, light output from the laser source with the analog signal to generate a modulated optical field signal; and transmits the modulated optical field signal.

17 Claims, 12 Drawing Sheets

EXAMPLE OF OPTICAL FIELD OF 2 SAMPLE/BIT NRZ LIGHT
(PRE-EQUALIZATION QUANTITY: 0)

TRANSMITTED OPTICAL WAVEFORM
( PRE-EQUALIZATION QUANTITY: -1,000 ps/nm )

RECEIVED OPTICAL WAVEFORM
(AFTER APPLICATION OF 1,000 ps/nm)

CHARACTERISTIC OF PRE-EQUALIZATION TRANSMISSION
(100% PRE-EQUALIZATION OF CHROMATIC DISPERSION OF
TRANSMISSION LINE AT RESPECTIVE POINTS)

RELATIONSHIP BETWEEN BANDWIDTH (-3 dB BANDWIDTH) OF POST FILTER AND DEGRADATION IN TRANSMISSION

POWER LEAK RATE OUTSIDE NYQUIST BANDWIDTH (-3 dB BANDWIDTH)

RELATIONSHIP BETWEEN BANDWIDTH (-3 dB BANDWIDTH) OF POST FILTER AND DEGRADATION IN TRANSMISSION

POWER LEAK RATE OUTSIDE NYQUIST BANDWIDTH (-3 dB BANDWIDTH)

WITHOUT RESPONSE EQUALIZATION

WITH RESPONSE EQUALIZATION

EYE PATTERN AFTER WAVEFORM COMPENSATION
(PRE-EQUALIZATION QUANTITY: 0)

CHROMATIC DISPERSION TOLERANCE AFTER WAVEFORM
COMPENSATION (PRE-EQUALIZATION QUANTITY: 0)

PRE-EQUALIZED OPTICAL TRANSMITTER AND PRE-EQUALIZED OPTICAL TRANSMISSION SYSTEM

CLAIM OF PRIORITY

The present application claims priority from Japanese patent application 2008-71260 filed on Mar. 19, 2008, the content of which is hereby incorporated by reference into this application.

BACKGROUND OF THE INVENTION

This invention relates to a technology of optical information transmission, and more particularly, to a technology suitable for transmission and reception of an optical signal transmitted via an optical fiber.

For transmission through an extremely high-speed optical fiber, a modulation speed and a transmission distance are limited by chromatic dispersion (CD), polarization mode dispersion (PMD), and bandwidth limit of the optical fiber and components used for the optical fiber.

The chromatic dispersion (CD) is a phenomenon in which light waves different in wavelength are transmitted at different speeds in an optical fiber. An optical spectrum of an optical signal modulated at high speed includes different wavelength components, and the different wavelength components reach a receiving end at different times due to influence of the chromatic dispersion. Thus, it is known that an optical waveform is largely distorted after the transmission. In order to avoid the influence of the chromatic dispersion, a technology of CD compensation (also referred to as dispersion compensation) has been studied. The CD compensation is a technology of, by providing, in an optical transmitter and an optical receiver, an optical device having a chromatic dispersion characteristic opposite to that of an optical fiber used for a transmission line, canceling the chromatic dispersion characteristic of the optical fiber, thereby preventing the optical waveform from being distorted. As an optical device used for the CD compensation, a dispersion compensation fiber, an optical interferometer, an optical circuit, an optical fiber grating, and the like which have chromatic dispersion opposite in sign to that of a transmission line are being studied.

Moreover, a technology of increasing a chromatic dispersion tolerance by improvising a modulation format, and a technology of compensating the chromatic dispersion by signal processing have been proposed. Optical pre-equalization (pre-distortion) transmission according to embodiments of this invention equalizes a field of an optical signal by signal processing carried out in a transmitter. In other words, an optical field waveform is generated in the transmitter by applying an inverse function of chromatic dispersion to a field of an optical signal, and the generated optical field waveform is transmitted via an optical fiber, thereby canceling influence of the chromatic dispersion of the optical fiber. A basic concept of this pre-equalization has existed for several decades, but a digital pre-equalization transmitter which carries out the pre-equalization based on high-speed digital signal processing has recently been proposed. Killey, R, "Dispersion and nonlinearity compensation using electronic predistortion techniques", Optical Fibre Communications and Electronic Signal Processing, 2005, The IEE Seminar on, Ref. No. 2005-11310 describes a technology of the digital pre-equalization transmitter.

FIG. 2 of above described "Dispersion and nonlinearity compensation using electronic predistortion techniques" illustrates an overall configuration of the pre-equalized optical transmitter, and, in the transmitter, a binary bit sequence to be transmitted (011101 . . . ) is input to a digital signal processor (DSP), and is converted by oversampling into complex field signals (two sets of digital data including the real part and imaginary part) including at least two sampling points per bit. The DSP, by carrying out digital numerical operation, further applies an inverse function of chromatic dispersion of an optical fiber transmission line to the complex field signals constituted by the real part and the imaginary part in advance. The complex field signals to which the inverse function of the chromatic dispersion is applied are transferred to high-speed D/A converters (DACs), which are also working as multiplexing circuits, are converted into analog electric waveforms, and are then input to two electric signal input terminals (I and Q) of an optical field modulator (dual-drive triple Mach-Zehnder modulator in the example illustrated in FIG. 2 of Killey, R, "Dispersion and nonlinearity compensation using electronic predistortion techniques", Optical Fibre Communications and Electronic Signal Processing, 2005, The IEE Seminar on, Ref. No. 2005-11310), and laser light is converted into a desired optical field ETx (real part I and imaginary part Q), and is output.

The oversampling is carried out by the DSP because the signal is sampled according to the Nyquist's theorem. In other words, the necessary sampling rate is at least twice the highest frequency (corresponding to bit rate Rb) of a signal to be sampled. Thus, generally, for the pre-equalization transmission, extremely high-speed DACs and digital signal processing circuits operating as fast as twice the bit rate (Rb) are necessary.

Moreover, the calculation required for the CD compensation is a linear complex operation of applying an inverse transmission function $H(W)=\exp(j\beta L\omega^2/2)$ of chromatic dispersion of a transmission line to an electrically generated field waveform. In this equation, $\omega$, $\beta$, and L respectively denote a difference of angular frequency from the center of an optical signal, a coefficient, and a transmission distance. The digital signal processor (DSP) is realized as a lookup table, a linear FIR filter with complex coefficients, or the like.

This pre-equalization transmission has an advantage that unlimited compensation is theoretically possible for linear degradation. For conventional optical and electrical CD compensation circuits, the quantity of compensation is limited by the size of devices and the loss, but according to the above-mentioned pre-equalization transmission, by increasing the quantity of the digital signal processing, theoretically, unlimited compensation is possible against linear degradation. The chromatic dispersion is an example of linear degradation in transmission employing an optical fiber, and the pre-equalization transmission through a standard single-mode fiber (SMF) is possible for an NRZ signal of 10 Gbit/s over at least 3,000 km.

FIGS. 1A to 1D illustrate a principle and a performance of conventional pre-equalization transmission at 40 Gbit/s of a binary intensity-modulated (IM) signal of 2 samples/bit.

FIG. 1A illustrates an example of an optical field of a 2 sample/bit NRZ signal when pre-equalization quantity is zero, and, as illustrated in FIG. 1A, to a D/A converter, two digital data pieces are input per one bit (section delimited by dotted lines). A solid line represents an electric signal output from the D/A converter, and is an electric waveform smoothly connecting sample points.

An example of FIG. 1B illustrates an optical output waveform obtained by pre-equalization of chromatic dispersion which applies a pre-equalization quantity of −1,000 ps/nm against chromatic dispersion by means of digital signal processing. The optical output waveform illustrated in FIG. 1B is severely distorted, and an eye opening is not observed. However, when the optical output waveform is transmitted through an optical fiber, and chromatic dispersion of 1,000 ps/nm is applied, as illustrated in FIG. 1C, an original eye opening is recovered, and a proper transmission characteristic is obtained.

An example illustrated in FIG. 1D is a result of calculation of evaluating a transmission characteristic of pre-equalization transmission while the chromatic dispersion of a transmission line is compensated 100%. For the pre-equalization, 55-stage and 119-stage FIR filters are used. While, when the 55-stage FIR filter is used, an OSNR penalty (OSNR sensitivity degradation) exceeding 1 dB is generated at a chromatic dispersion quantity of approximately 1,000 ps/nm, when the 119-stage FIR filter is used, transmission is possible without generating an OSNR penalty for a chromatic dispersion quantity exceeding even 1,400 ps/nm. When the number of stages of an FIR filter is limited as in the 55-stage FIR filter, a quantity of chromatic dispersion for which pre-equalization transmission is possible is limited, and the maximum transmission distance is thus determined.

However, the pre-equalization transmission poses the following problems.

A first problem is that high-speed and high-quantity digital signal processing is necessary. For the pre-equalization of chromatic dispersion, high-speed D/A converters operating with processing speed of at least twice the bandwidth of a signal are necessary. Specifically, for signal transmission of a bit rate of 10 Gbit/s, 20 Gsample/second (Sa/sec) is necessary, and, for signal transmission of a bit rate of 40 Gbit/s, 80 GSa/sec is necessary. Further, it is necessary for the pre-equalization processing (FIR filter of several tens of stages) to operate at the same speed.

A second problem is that the quantity of chromatic dispersion which can be pre-equalized decreases rapidly as the bit rate increases. It is known that the distortion in the optical field waveform generated by the chromatic dispersion is proportional to (bit rate)$^2$×(quantity of chromatic dispersion of transmission line). In other words, as the bit rate of signal transmission increases from 10 Gbit/s to 40 Gbit/s, the quantity of chromatic dispersion which can be compensated by a compensation circuit of the same circuit scale (such as a compensation circuit having a lookup table of the same size) decreases to as much as $\frac{1}{16}$, resulting in a large decrease in maximum transmission distance.

A third problem is that a chromatic dispersion tolerance does not increase. In the pre-equalization transmission, a transmitter can cancel the chromatic dispersion in advance, but a chromatic dispersion tolerance of an optical signal after transmission does not increase. For example, the dispersion tolerance of an ordinary NRZ signal is 1,200 ps/nm for transmission at a bit rate of 10 Gbit/s, and 80 ps/nm for transmission at a bit rate of 40 Gbit/s. When the pre-equalization of 1,000 ps/nm is carried out, a transmittable range of the signal is 1,000±600 ps/nm for transmission at the bit rate of 10 Gbit/s, and 1,000±40 ps/nm for transmission at the bit rate of 40 Gbit/s. When the chromatic dispersion tolerance is converted into the length of the single-mode fiber (SMF), a length of ±37 km is provided for the transmission at the bit rate of 10 Gbit/s, and a length of ±2 km is provided for the transmission at the bit rate of 40 Gbit/s. It is thus necessary for the pre-equalization to precisely measure the chromatic dispersion quantity of a transmission line in advance or to feed back information on degradation such as chromatic dispersion from a receiver.

Moreover, considering a change in quantity of chromatic dispersion in a transmission line due to a change in temperature, for the transmission at the bit rate of 40 Gbit/s, the chromatic dispersion tolerance becomes insufficient, and it is thus necessary to compensate the deficiency in quantity of chromatic dispersion by a variable CD compensator or the like, resulting in difficulty in cost reduction.

In order to solve the above-mentioned problems, P. Watts, "Performance of Electronic Predistortion Systems with 1 Sample/bit Processing using Optical Duobinary Format", paper Tu.3.1.6, ECOC, 2007, and M. M. El Said, "An Electrically Pre-Equalized 10-Gb/s Duobinary Transmission System", Journal of Lightwave Technology, Vol. 23, No. 1, January 2005 describe a 1 sample/bit optical duo-binary pre-equalization which reduces the sampling rate to ½.

FIG. 2 illustrates a configuration of a conventional 1 sample/bit optical duo-binary pre-equalization transmitter 120 described in the above described "Performance of Electronic Predistortion Systems with 1 Sample/bit Processing using Optical Duobinary Format". In the example illustrated in FIG. 2, when a binary digital signal is input, the input digital signal is input to a duo-binary precoder circuit 103 constituted by a delay-adding circuit, is converted into a duo-binary signal, and is output as a ternary duo-binary signal 113.

The output ternary duo-binary signal 113 is input to a pre-equalization circuit 122 constituted by a lookup table, and is converted into a complex field waveform to which an inverse function of chromatic dispersion is applied according to a bit pattern. For the converted ternary duo-binary signal 113, the real part of the complex field waveform is input to a D/A converter 107-1, and the imaginary part of the complex field waveform is input to a D/A converter 107-2.

The D/A converters 107-1 and 107-2 respectively convert the digital information signal input at 1 sample/bit into an electric waveform of an analog information signal. The converted analog information signals are respectively input to 4-th order Bessel filters 123-1 and 123-2, which are post filters, unnecessary high frequency components are reduced, and the analog information signals are converted into smoothed high-frequency electric waveforms. The converted high-frequency electric waveforms are respectively input to I and Q input terminals of an optical field modulator (IQ modulator) 110, which modulates the real part and imaginary part of an optical signal output from a laser source 101.

Thus, the real part and the imaginary part of the two electric digital signals output from a pre-equalization signal generation circuit 124 are respectively up-converted to the real part and the imaginary part of the output optical field of the pre-equalization transmitter 120. The optical signal output from the transmitter 120 is transmitted through an optical fiber transmission line 111, and is received by an optical receiver 112. When the optical signal is transmitted through the optical fiber transmission line 111, the inverse function of the chromatic dispersion applied by the pre-equalization circuit 122 cancels chromatic dispersion of the optical fiber transmission line 111, and hence an optical waveform without the influence of the chromatic dispersion is theoretically input to the optical receiver 112.

The 1 sample/bit processing is enabled by a fact that the duo-binary signal includes only a half of the frequency bandwidth (half of the bit rate for binary) compared with the intensity modulation. Thus, according to the Nyquist's theorem, even when the sampling rate of the digital signal is reduced by half to 1 sample/bit, the pre-equalization transmission is possible. Moreover, the sampling rate of the D/A converters and the processing speed of the digital signals can also be reduced to a half, thereby reducing the cost, and increasing the system feasibility.

SUMMARY OF THE INVENTION

This invention is intended to solve a problem that the conventional 1 sample/bit optical duo-binary pre-equalization transmitter attains only a performance lower than the ideal performance.

Moreover, when the chromatic dispersion tolerance is small, an error is generated in measurement of chromatic dispersion of a transmission line, and the chromatic dispersion is not correctly obtained, resulting in difficulty of transmission.

For the conventional 1 sample/bit optical duo-binary pre-equalization transmitter, the performance of the pre-equalization is limited.

For example, FIG. 3 in "Performance of Electronic Predistortion Systems with 1 Sample/bit Processing using Optical Duobinary Format", illustrates a relationship between a memory size (address size of a lookup table=circuit scale) and the transmission distance. According to the graphs of FIG. 3 in "Performance of Electronic Predistortion Systems with 1 Sample/bit Processing using Optical Duobinary Format", the transmission distances of signals obtained from the same circuit scale (address size is 17 bits, for example) and transmitted at a bit rate of 10 Gbit/s are 1,200 km for 2 sample/bit optical duo-binary (ODB), which is the longest, and 800 km for 2 sample/bit NRZ-intensity modulation (on-off keying, OOK) and 1 sample/bit optical duo-binary (ODB). In this way, even when compensation circuits of the same circuit scale are used, the transmission distance by the pre-equalization transmission of a 1 sample/bit optical duo-binary signal is shorter than that in the case of the 2 sample/bit optical duo-binary signal.

Moreover, the chromatic dispersion tolerance is observed from curves in gray color illustrated in FIG. 2 of the above described "Performance of Electronic Predistortion Systems with 1 Sample/bit Processing using Optical Duobinary Format" (clearly stated in a caption of FIG. 2 of "Performance of Electronic Predistortion Systems with 1 Sample/bit Processing using Optical Duobinary Format"). In other words, the respective gray curves indicate transmission characteristics obtained by pre-equalization for specific target distances, and, when an actual optical fiber length (horizontal axis) deviates from the target distance, the transmission characteristic degrades, resulting in concave-up curves. A horizontal width of the resulting curve corresponds to the chromatic dispersion tolerance. Comparison between the transmission characteristic of 2 sample/bit optical duo-binary transmission illustrated in FIG. 3(a) of "Performance of Electronic Predistortion Systems with 1 Sample/bit Processing using Optical Duobinary Format", and that of 1 sample/bit optical duo-binary transmission illustrated in FIG. 3(b) thereof reveals that, for the same target distance (such as 700 km), the horizontal width of a curve representing the transmission characteristic of the 1 sample/bit optical duo-binary transmission is ⅓ to ¼ of that of the 2 sample/bit optical duo-binary transmission, which means a large decrease in tolerance (chromatic dispersion tolerance) against the error in transmission distance.

Moreover, the above described "An Electrically Pre-Equalized 10-Gb/s Duobinary Transmission System" compares the characteristic of the 2 sample/bit optical duo-binary transmission and the characteristic of 1 sample/bit optical duo-binary transmission. "An Electrically Pre-Equalized 10-Gb/s Duobinary Transmission System" describes that, for the same circuit scale, namely, for an FIR filter having the same number of taps, the 1 sample/bit pre-equalization transmission presents a longer transmission distance. However, it is pointed out that, for the same transmission distance, a received waveform of 1 sample/bit optical duo-binary transmission (T-spaced Equalizer) illustrated in FIG. 10(c) of "An Electrically Pre-Equalized 10-Gb/s Duobinary Transmission System" for example, is more distorted than that of the 2 sample/bit optical duo-binary transmission (T/2-spaced Equalizer) illustrated in FIG. 9(c) of "An Electrically Pre-Equalized 10-Gb/s Duobinary Transmission System". Therefore, in the subsequent section, only 2 sample/bit optical duo-binary format is discussed.

It is a first object of this invention to solve the problem of the degradation of the transmission characteristic of the 1 sample/bit optical duo-binary format, and to attain a pre-equalization transmission characteristic equal to that of the 2 sample/bit optical duo-binary format. As a result, by halving the sampling rate and the operation speed of a digital signal processing circuit, it is possible to reduce the cost and the power consumption, resulting in a large increase in feasibility. Moreover, it is possible to realize transmission over a transmission distance four times as large as that of a transmission format of the same circuit scale.

It is a second object of this invention to provide means for preventing insufficient chromatic dispersion tolerance, which is the problem with the 1 sample/bit optical duo-binary format.

It is a third object of this invention to increase the transmission capacity of an information signal of the 1 sample/bit optical duo-binary format.

A representative aspect of this invention is as follows. That is, there is provided a pre-equalized optical transmitter, comprising: a laser source; a duo-binary precoder circuit; a pre-equalization circuit for applying an inverse function of chromatic dispersion; at least two D/A converters; and an optical field modulator comprising at least two input terminals for an electric signal. The pre-equalized optical transmitter: converts, by the duo-binary precoder circuit, a digital information signal of a predetermined symbol time to be transmitted into a digital complex signal including one sampling point per symbol; equalizes, by the pre-equalization circuit, degradation in transmission of the digital complex signal, and input the digital complex signal equalized in terms of the degradation in transmission to the at least two D/A converters; converts, by the at least two D/A converters, the equalized digital complex signal into an analog signal; suppresses, among the converted analog signals, an analog signal leaking outside a Nyquist bandwidth by at least 23 dB, and input the suppressed analog signal to the optical field modulator; modulates, by the optical field modulator, light output from the laser source with the analog signal to generate a modulated optical field signal; and transmits the modulated optical field signal.

According to an embodiment of this invention, it is possible, by preventing the information signal from leaking outside the Nyquist bandwidth, to increase the pre-equalization transmission performance and the practicality of the 1 sample/bit optical duo-binary signal.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Figure 1A:
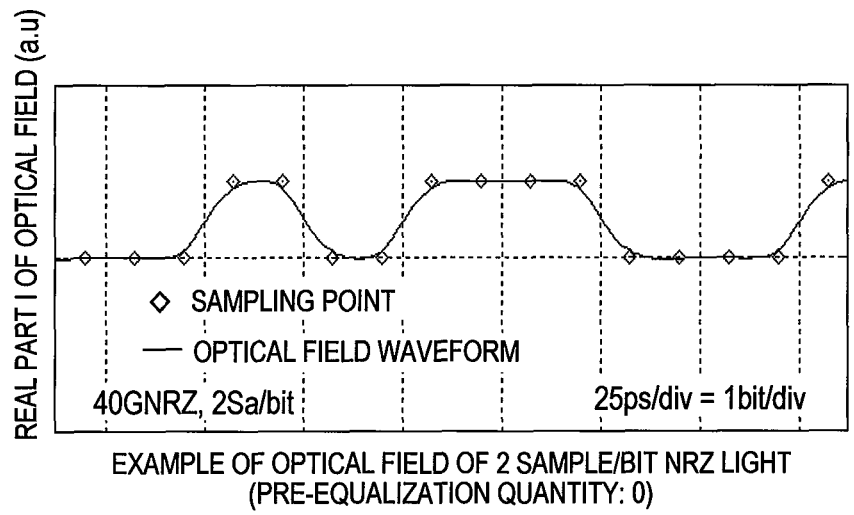
FIGS. 1A to 1D are explanatory diagrams showing a principle and a performance of conventional pre-equalization transmission of a binary intensity-modulated signal of 2 samples/bit.
Figure 1B:
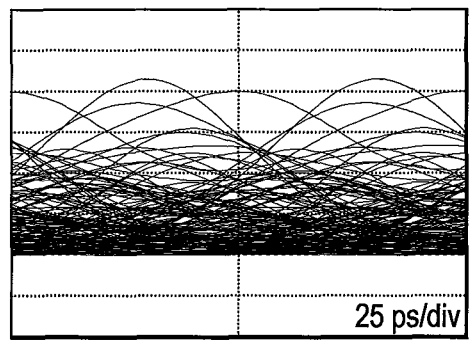

A description is now given of an overview of embodiments of this invention.

The first object of this invention is solved by, when pre-equalized digital signals are converted into analog waveforms, suppressing leak outside the Nyquist bandwidth of the signals output from D/A converters by at least 23 dB. For example, this is realized by providing, at an output unit of the respective D/A converters, a post filter which suppresses the signal leak by at least 23 dB. Moreover, a narrow band-pass optical filter which suppresses the signal leak outside the Nyquist bandwidth by at least 23 dB may be provided at any location from an optical modulator to a receiver.

Moreover, it is efficient to constitute the post filter by a high-cut filter such as a Butterworth filter, an elliptic filter, and a Chebyshev filter higher than 5-th order, and a multi-stage connection thereof, which have not conventionally been used for optical intensity modulation and optical duo-binary modulation.

When the post filter with a steep characteristic is employed, an eye opening of the optical signal decreases sharply, but it is effective to equalize this decrease by a digital response equalizing filter provided on a previous stage of the D/A converters. Moreover, this is also realized by analog response equalizing filters which are provided on a subsequent stage of the D/A converters, and equalize a time response of the post filter. The digital processing circuit may be partially or entirely realized according to the 1 sample/symbol method, and circuit operation speed can be reduced.

Moreover, a problem of chromatic dispersion tolerance of a generated optical duo-binary signal can be solved by, with a complex duo-binary electric signal before input to a pre-equalization circuit or an optical duo-binary signal after transmission through an optical fiber which includes a code pattern of three symbols in which a mark symbol is placed before or after two successive space symbols, carrying out such modulation that the intensity of the complex signal at a bit border of the two successive space symbols is always non-zero, and the phase is inverted with respect to the mark symbol thereby moving the center of gravity of the signal point of the optical signal, and introducing an optical interference effect.

Specifically, the chromatic dispersion tolerance is realized by, at a space symbol point following a positive mark symbol or a negative mark symbol, setting the amplitude value of a complex field to a predetermined non-zero amplitude value, inverting the phase of the space symbol with respect to the preceding mark symbol, and outputting the signal, and, at a space symbol point preceding a positive mark symbol or a negative mark symbol, setting the amplitude value of a complex field to a predetermined non-zero amplitude value, inverting the phase of the space symbol with respect to the following mark symbol, and outputting the signal.

In this case, by providing a waveform compensation circuit for moving forward or backward the center of gravity on the time axis of the optical field waveform before the pre-equalization, residual light of the space symbol set to the non-zero amplitude value can be moved to the bit boundary, and, thus, an optical interference effect can be increased.

Moreover, by employing a digital 'non-linear phase' compensation circuit for a 1 sample/symbol method for compensating a non-linear effect of an optical fiber, a non-linear effect such as self-phase modulation can be compensated in addition to the chromatic dispersion.

Moreover, by inputting two sets of information signals to a duo-binary precoder circuit, outputting two sets of complex duo-binary codes which are components orthogonal to each other, inputting the output two sets of complex duo-binary codes to a signal processing circuit on the following stage, and simultaneously transmitting as one set of complex signal, the bit rate of the information signal can be doubled, thereby realizing efficient signal processing.

Moreover, by polarization-multiplexing two sets of output signals of a pre-equalized optical transmitter into different polarization states, and then outputting, or by wavelength multiplexing or orthogonal optical frequency multiplexing at least two sets of output signals of a pre-equalized optical transmitter, and then outputting, an information bit rate of one transmitter can be increased by several times.

Referring to the drawings, a description is now given of the embodiments of this invention.

First Embodiment

Figure 3:
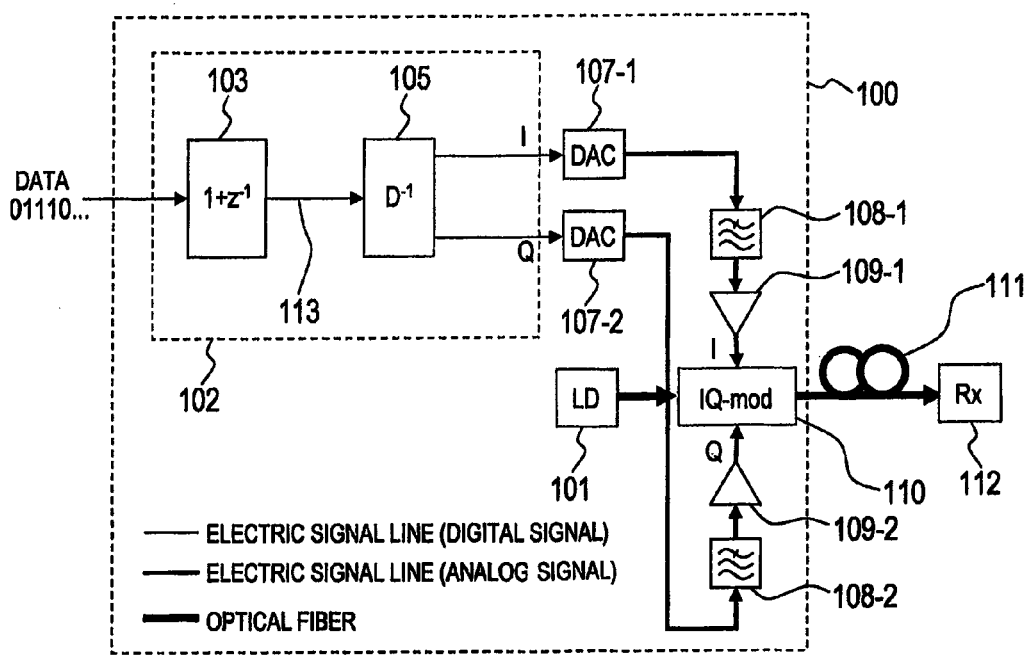
FIG. 3 is a block diagram showing a configuration of an optical transmission system in accordance with a first embodiment of this invention.

FIG. 3 is a block diagram of a configuration of an optical transmission system according to a first embodiment of this invention.

Routes of digital signals are represented by thin lines, routes of high-speed analog electric signals are represented by medium lines, and routes of optical signals are represented by thick lines. In an example described below, a binary information signal is converted into a ternary duo-binary signal to be transmitted. For the binary information signal, the bit rate and the symbol rate (baud rate) coincide with each other, and hence both of them have the same meaning in this case. However, as described later, this embodiment can be applied to a multi-valued information signal, and, in this case, transmission as 1 sample/symbol is necessary.

In the optical transmission system illustrated in FIG. 3, a 1 sample/bit pre-equalization optical duo-binary transmitter 100 inputs a non-modulated laser light output from a laser source 101 to an optical field modulator 110, modulates the laser light by necessary field modulation into an optical field signal, and outputs the modulated optical field signal to an optical fiber transmission line 111. The modulated optical field signal output to the optical transmission line 111 is received by an optical receiver 112.

To the 1 sample/bit pre-equalization optical duo-binary transmitter 100, a binary digital data sequence (bit sequence of 0 and 1) to be transmitted is input. A duo-binary precoder circuit 103 delays the input digital data sequence by one bit, and generates a 1 sample/bit duo-binary signal by adding the digital data sequence delayed by one bit and the original input digital data sequence to each other. Then, the generated duo-binary signal is converted into an optical field complex symbol sequence, and the converted complex symbol sequence is output. The generated duo-binary signal is represented by ternary codes (for example, 1, 0, and −1, or 0, 1, and 2), and accordingly a 1 sample/bit ternary duo-binary signal 113 is output from the duo-binary precoder circuit 103.

The output duo-binary signal 113 is input to a pre-equalization circuit 105. The pre-equalization circuit 105 applies an inverse function of degradation (such as degradation in waveform caused by the chromatic dispersion) generated in the optical fiber transmission line 111 and the like, thereby equalizing the degradation in transmission. Then, the pre-equalization circuit 105 outputs a 1 sample/bit complex signal. The pre-equalization circuit 105 according to this embodiment is realized as a transversal filter. A real part I and an imaginary part Q of the output complex signal are respectively input to D/A converters 107-1 and 107-2.

The D/A converters 107-1 and 107-2 convert the real part I and the imaginary part Q of the input complex signal into high-speed analog electric signals. The converted analog electric signals respectively pass through post filters 108-1 and 108-2, and are respectively input to driver circuits 109-1 and 109-2. The driver circuits 109-1 and 109-2 output signals which are obtained by amplifying the input analog electric signals to a sufficient amplitude. The output analog electric signals are input to the optical field modulator 110.

The optical field modulator 110 uses the input analog electric signals to modulate the laser light output from the laser source 101 into the optical field signal.

Figure 4A:
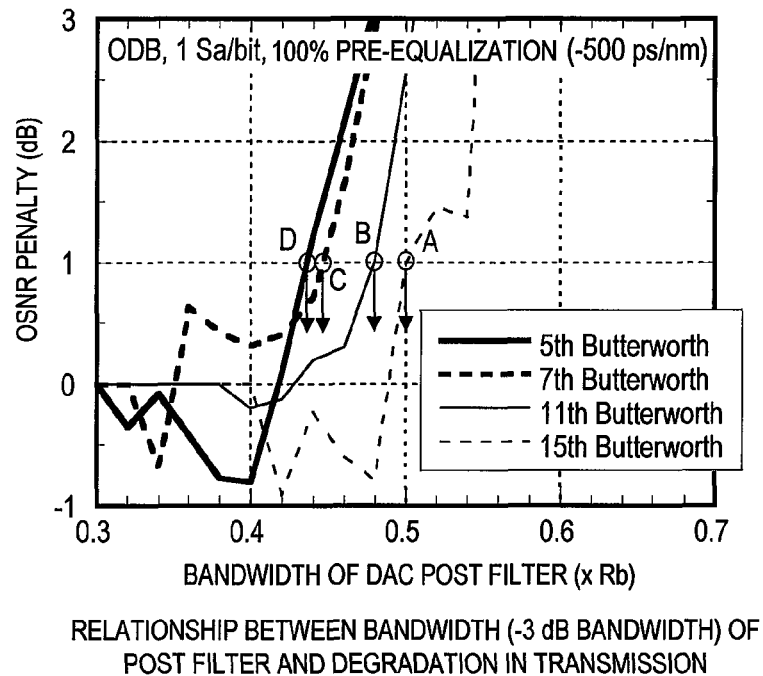
FIGS. 4A and 4B are explanatory diagrams showing influence on a transmission characteristic of a post filter in accordance with the first embodiment of this invention.
Figure 4B:
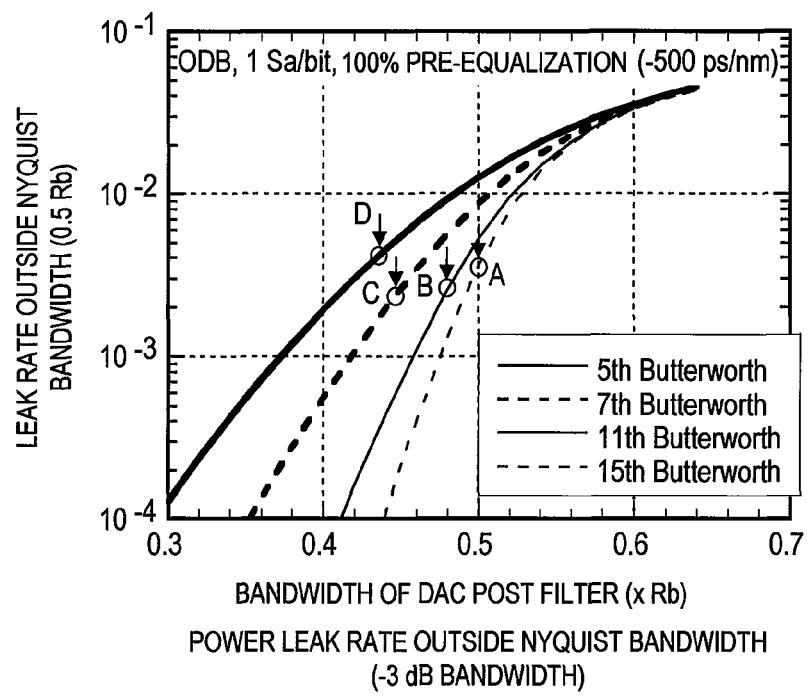

A feature of this embodiment resides in that, of energy of information signals input to the optical field modulator 110 described above, a leak outside the Nyquist bandwidth (for a binary information signal, a bandwidth of a half of a bit rate Rb) is suppressed by at least 23 dB (=equal to or less than 1/200). Referring to FIGS. 4A and 4B, a description is now given of a reason therefor.

FIGS. 4A and 4B describe influence on a transmission characteristic of the post filters 108-1 and 108-2, which are high-cut filters according to the first embodiment of this invention.

FIG. 4A illustrates an example of numerical calculation of signal quality degradation (OSNR penalty) after pre-equalization transmission of a 1 sample/bit optical duo-binary signal at 40 Gbit/s while a configuration and a bandwidth of the post filters 108-1 and 108-2 are changed.

For the numerical calculation, a chromatic dispersion quantity of the transmission line is 500 ps/nm and a pre-equalization quantity pre-equalized in the pre-equalization circuit 105 of the transmitter 100 is −500 ps/nm (pre-equalization quantity: 100%). Thus, when the pre-equalization circuit 105 is ideally operating, the degradation in waveform does not occur, and the OSNR penalty is thus 0 dB. However, as for the OSNR penalty illustrated in FIG. 4A, respective curves largely fluctuate, and the setting of the post filters 108-1 and 108-2 greatly influence realization of the 1 sample/bit pre-equalization duo-binary transmission. FIG. 4A illustrates results obtained for 5-th to 11-th order Butterworth post filters, but the same calculation is carried out for Bessel filters which are usually used as the post filters. However, when the Bessel filters are used, the OSNR penalty is so large as to be out of the range of FIG. 4A, and thus the case of using the Bessel filters is not illustrated in FIG. 4A. All of the respective curves illustrated in FIG. 4A indicate that when the bandwidth (bandwidth up to −3 dB) of the post filters 108-1 and 108-2 is reduced to a certain extent, the OSNR penalty can be small. For example, when a permissible OSNR penalty is 1 dB which is widely used as a standard for degradation in transmission quality, and, as illustrated in FIG. 4A, a 15-th order Butterworth filter which presents a steep equalization characteristic is used as the post filters 108-1 and 108-2, the bandwidth of the post filters is equal to or less than 0.5 Rb, when a 11-th order Butterworth filter is used, the bandwidth of the post filters is equal to or less than 0.48 Rb, when a 7-th order Butterworth filter is used, the bandwidth of the post filters is equal to or less than 0.44 Rb, and a 5-th order Butterworth filter is used, the bandwidth of the post filters is equal to or less than 0.36 Rb. In other words, a filter which is inferior in high-cut characteristic has a narrow pass band, and hence it is necessary to use post filters presenting a high high-cut characteristic. In this way, the effect of pre-equalizing the chromatic dispersion is available in a bandwidth of equal to or less than only Rb/2 which is the Nyquist bandwidth.

FIG. 4B illustrates a result of calculated ratio (leak rate) of the energy outside the Nyquist bandwidth for the respective filters. When post filters with a steep characteristic are used, or the −3 dB bandwidth of the post filter is narrowed, it is possible to suppress the leak rate to low. It is observed that leak rates illustrated in FIG. 4B calculated for respective points A to D of FIG. 4A at which the OSNR penalty is 1 dB are 0.2% (leak rate is suppressed by 27 dB) to 0.5% (leak rate is suppressed by 23 dB). In other words, by suppressing a rate of the signal energy which leaks outside the Nyquist bandwidth, and does not receive the pre-equalization effect by at least 23 dB, the degradation in 1 sample/bit pre-equalization transmission can be sufficiently suppressed.

The reason for the above-mentioned numerical value (23 dB) is further described as follows. In other words, it is assumed that a component of energy which is outside the Nyquist bandwidth, and is not thus pre-equalized still remains 0.5%. The optical field is a square root of the energy, and the remaining energy component of 0.5% corresponds to approximately 7% of the electric field amplitude.

The optical phase of the remaining energy component is not controlled after transmission, and hence the remaining energy component is random in phase, and interferes with the original signal component. In this case, the optical intensity change is represented as $(1+0.07)^2-(1-0.07)^2=28\%$, and corresponds to a fluctuation width of approximately 1 dB in terms of the eye opening. In other words, in order to suppress the energy of the uncontrollable component outside the Nyquist bandwidth to the degradation of 1 dB in terms of the eye opening, it is necessary to attain the suppressing rate equal to or more than 23 dB.

Figure 5A:
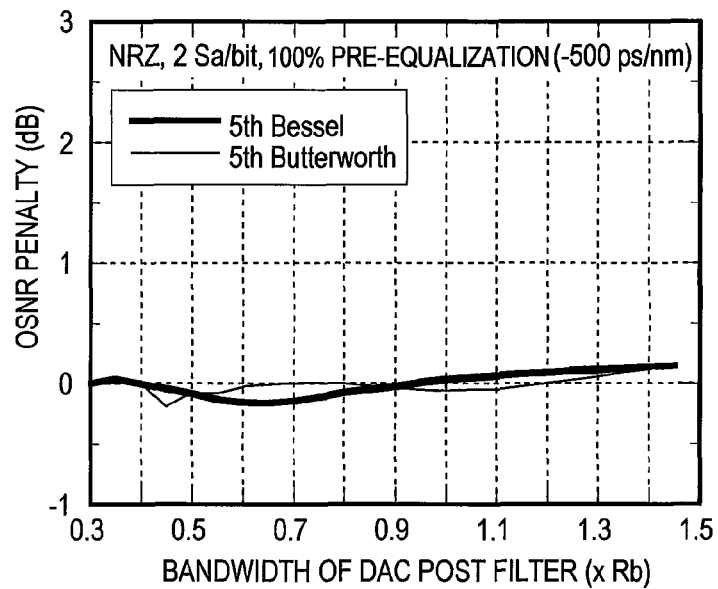
FIGS. 5A and 5B are explanatory diagrams showing influence of a post filter in a conventional pre-equalization transmission of a binary intensity-modulated signal of 2 samples/symbol.
Figure 5B:
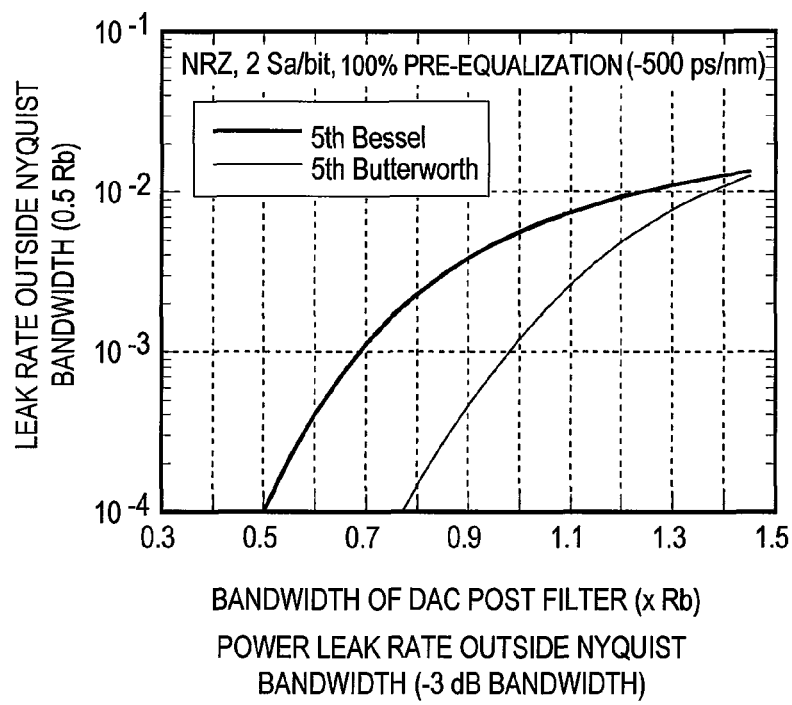

FIGS. 5A and 5B describe influence of post filters in a conventional 2 sample/symbol pre-equalization transmitter for modulating a binary information signal by the optical intensity modulation on the transmission characteristic calculated under the same conditions as this embodiment. As the post filters, 5-th order Bessel filters and 5-th order Butterworth filters are used.

In an example illustrated in FIG. 5A, independently to the bandwidth and the configuration of the filters, the degradation in transmission is suppressed to approximately zero. In this way, the conventional pre-equalization transmission is hardly influenced by the configuration of the post filters. Thus, conventionally, it is not necessary to employ filters with a steep characteristic as the post filters, and Bessel filters which do not influence the waveform of a high-speed optical signal, and have a flat group delay characteristic (such as 5-th order Bessel filters with a bandwidth of 0.7 Rb) are used.

An example of FIG. 5B illustrates leak rates of the respective filters, and for the pre-equalization transmission with the binary optical intensity modulation, even the filters of this level can largely suppress the leak rate. This is because, as a result of the digitizing according to the 2 sample/symbol, the Nyquist bandwidth is equal to Rb, and becomes wider compared with the bandwidth of the binary intensity-modulated signal. On the other hand, for the optical duo-binary signal, the bandwidth of the signal is compressed by half by the duo-binarization, and thus has a high signal spectrum density. As a result, when the sampling rate is halved, filters with a steep characteristic are necessary.

According to this embodiment, in order to attain the above-mentioned leak rate of the filters as well as a desired leak rate of the filters, the characteristics of the post filters 108-1 and 108-2 are important. In other words, for the conventionally widely-used Bessel filters, even when the order of the Bessel filter is increased, it is difficult to obtain a steep high-cut characteristic, and, in order to attain the above-mentioned condition of the suppression, it is necessary to excessively decrease the 3 dB bandwidth of the filters 108-1 and 108-2 (decrease the 3 dB bandwidth of the filters to 0.3 Rb or less, for example). As a result, a drive waveform degrades.

Therefore, for the 1 sample/bit pre-equalization transmission according to this embodiment, high-cut filters focused on the high-cut characteristic (such as Butterworth filters, Chebyshev filters, and elliptic filters higher than 5-th order) are preferably used as the post filters. Those high-cut filters may be connected on a plurality of stages (serially connected) to increase the cut characteristic if necessary. It should be noted that the post filters may be provided before and after the driver circuits. Moreover, the post filters may be integrated and implemented as a part of a circuit inside the driver circuits and the D/A converters 107-1 and 107-2.

A description is now given of respective configurations of this embodiment.

The duo-binary precoder circuit 103 according to this invention is a circuit for delaying an information signal by one symbol, and adding the delayed symbol, but the duo-binary precoder circuit 103 may convert the input information into amplitude modulation of output signal. Moreover, the duo-binary precoder circuit 103 may carry out a complex coordinate conversion which carries out a rotation on a complex plane. When the precoding is carried out only by the real operation without the complex coordinate conversion, only the real part of the input signal sequence is input to the pre-equalization circuit 105 on the following stage, and, thus, the cost and the space for an input terminal and an operation circuit for the complex component can be saved.

The pre-equalization circuit 105 according to this invention, similarly to a conventional pre-equalization circuit, applies an inverse function of linear degradation of the transmission line, especially an inverse function of the chromatic dispersion, and can be realized by a lookup table, a complex transversal filter, or the like. The pre-equalization circuit 105 preferably includes a pre-equalization quantity control input unit, which is not illustrated in FIG. 3, for setting the pre-equalization quantity so that the chromatic dispersion quantity depending on a transmission distance of the optical fiber transmission line 111 is cancelled, resulting in an optimal transmission state.

For the optical field modulator 110, as in the conventional pre-equalization transmission, an optical IQ modulator (also referred to as dual parallel modulator or optical SSB modulator), which is constituted by two Mach-Zehnder optical modulators configured as a Mach-Zehnder interferometer, is used. The optical IQ modulator directly converts voltage signals applied to two I and Q terminals into an IQ signal of the output optical field, and is thus suitable for the optical field modulator 110 according to this invention.

Moreover, as the IQ modulator, there are known a modulator employing lithium niobate crystals and a modulator employing semiconductors, and, as long as equivalent functions are provided, any modulator can be used.

Moreover, when the applied voltage approaches a half-wave voltage V•, those modulators lose linearity in the field modulation, but this problem can be solved by a method of decreasing the applied voltage so that the range of the applied voltage sufficiently falls in the linear range, a method of realizing linearity by a table for applied voltage or an external compensation circuit which provides an inverse characteristic compensating the non-linearity, and the like.

Moreover, as described later, instead of the optical IQ modulator, a plurality of modulators, such as a tandem arrangement of an amplitude modulator and a phase modulator, can provide a similar effect. In this case, voltage signals fed to the respective modulators need to be converted in advance by a proper coordinate conversion (such as coordinate conversion to a polar coordinate).

Moreover, in the example illustrated in FIG. 3, lines for the respective digital signals are represented by a single thin line, but a high-speed digital signal is generally configured as a plurality of parallel lines (equal to or more than four to 128 lines, for example) for transmission of low-speed electric digital signals. Thus, internal components of the respective circuits and lines for connecting the respective circuits with each other may be realized respectively by parallel low-speed digital signal processing and digital lines which have equal functions and transmission quantity.

According to the first embodiment of this invention, it is possible, by preventing an information signal from leaking outside the Nyquist bandwidth, to increase the pre-equalization transmission performance and the practicality of the 1 sample/bit optical duo-binary signal. As a result, the signal processing speed inside the pre-equalization transmitter and the operation speed of the D/A converters can be halved compared with the conventional case, thereby reducing the cost and power consumption, and increasing the practicality. For example, for the pre-equalization transmission of a signal at 40 Gbit/second, D/A converters and signal processing ICs carrying out processing at 80 Gsample/second are conventionally necessary, but the practicality increases when the processing can be carried out at a speed of 40 Gsample/second. Especially, when the operation speed of the D/A converters is halved, the number of circuits deployed in parallel decreases, resulting in a large decrease in circuit scale, cost, and power consumption.

Moreover, D/A converters and signal processing ICs which need to carry out processing at 20 Gsample/second, which are required for signal processing at 10 Gbit/second, can carry out the processing at 10 Gsample/second, and, thus, are integrated along with other processing circuits by using a process enabling large scale integration at low cost such as that used for a CMOS-IC, and the like, resulting in a further reduction in cost.

Moreover, the bandwidth of the frequency of the optical signal and the sampling rate are halved, and hence the influence of the chromatic dispersion is practically reduced by ¼, and, when a lookup table of the same address size and an FIR filter of the same order are used, the performance of the pre-equalization against the chromatic dispersion, namely the maximum transmission distance, can be increased by four times. Moreover, the chromatic dispersion tolerance after the pre-equalization can be increased by as high as approximately four times.

Second Embodiment

Figure 6:
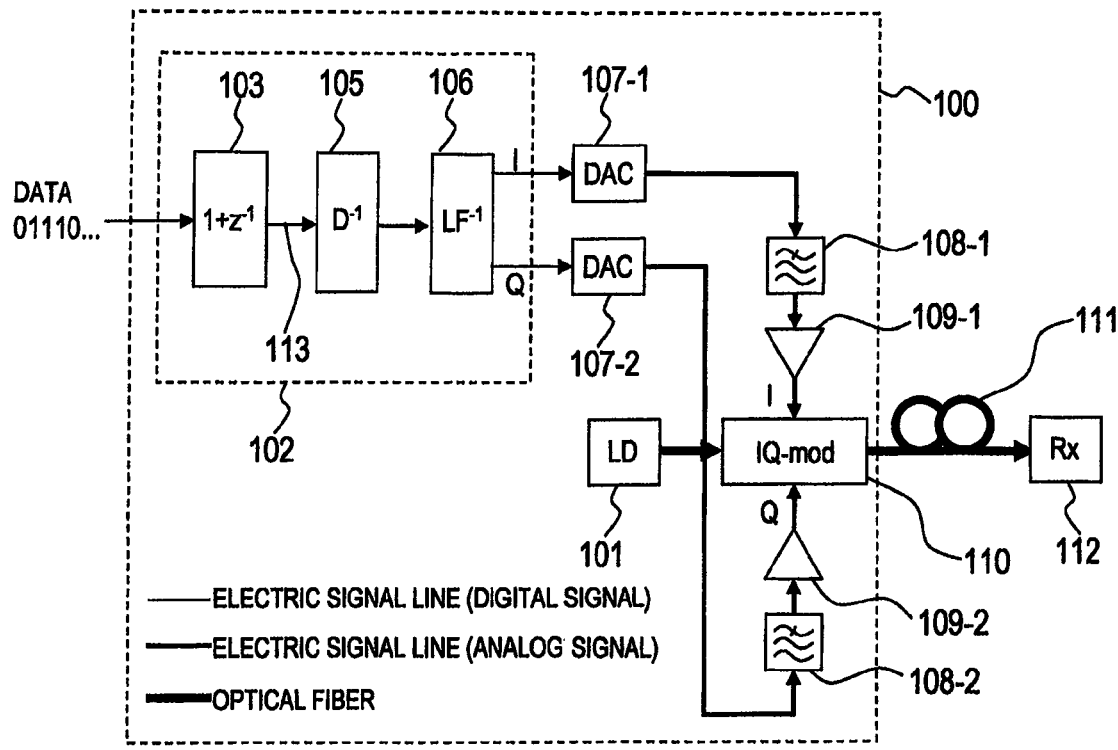
FIG. 6 is a block diagram showing a configuration of an optical transmission system in accordance with a second embodiment of this invention.

FIG. 6 is a configuration diagram of an optical transmission system according to a second embodiment of this invention, and a post-filter response equalizing filter 106 is added to the 1 sample/bit optical duo-binary pre-equalization transmitter 100 according to the first embodiment of this invention.

The post-filter response equalizing filter 106 is realized by a 1 sample/bit digital filter, and is a circuit for equalizing in advance an impulse response (time response) of the post filters 108-1 and 108-2.

Figure 7A:
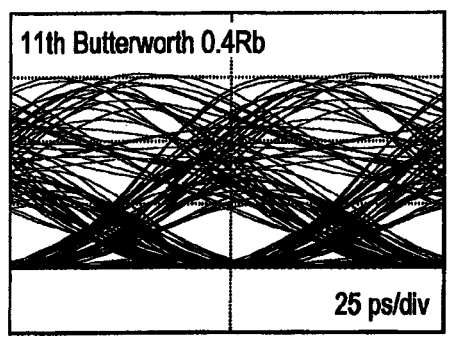
FIGS. 7A and 7B are explanatory diagrams showing optical waveforms showing an effect of a response equalization in accordance with the second embodiment of this invention.
Figure 7B:
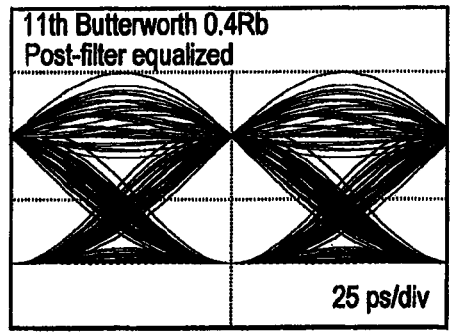

FIGS. 7A and 7B illustrate optical waveforms showing an effect of the post-filter response equalizing filter 106, and an example illustrated in FIG. 7A shows optical waveforms after pre-equalization transmission (pre-equalization rate: 100%) when the post-filter response equalizing filter 106 is not used. In the example illustrated in FIG. 7A, an 11-th order Butterworth filter −3 dB bandwidth of 0.4 Rb is used as the post filters 108-1 and 108-2. The post filters 108-1 and 108-2 largely cut the signal spectrum, and hence the waveforms are degraded. In this case, even when the pre-equalization transmission is carried out, the reception sensitivity largely degrades, and, thus, the performance such as transmission distance largely decreases. Therefore, the post-filter response equalizing filter 106 cancels the degradation in waveform using an inverse function of the impulse response of the post filters 108-1 and 108-2.

An example of FIG. 7B illustrates optical waveforms after pre-equalization transmission (pre-equalization rate: 100%) when the post-filter response equalizing filter 106 is used, and an approximately perfect eye opening is obtained at the center of the bit time. As in this embodiment, when a filter such as a Butterworth filter, which has a steep characteristic, and does not has a phase linearity, is used, a group delay increases in a transient part of the filter, and typically, an equalizing FIR filter of equal to or more than ten stages which has a long response time is necessary. In the example of FIG. 7B, the response equalization for the post filters is realized by 33-stage equalizing FIR filter.

As described above, for the processing for preventing the leak of the information signal, high-order post filters causing a large distortion of the waveform are necessary, and those post filters may largely cause degradation in waveform and degradation in reception sensitivity, which have not been conventionally observed. However, by employing the response equalizing filter for digitally compensating the impulse response (impulse time response) of the post filters, the above-mentioned degradations can be easily prevented at low cost.

Moreover, as illustrated in FIG. 6, the post-filter response equalizing filter 106 is provided on the previous stage of the D/A converters 107-1 and 107-2, but post-filter response equalizing filters may be provided on a subsequent stage of the D/A converters 107-1 and 107-2. For example, the post-filter response equalizing filters may be realized as an analog signal processing circuit after the transmission through the post filters 108-1 and 108-2, and a filter on the reception side or an analog filter by signal processing.

Figure 8A:
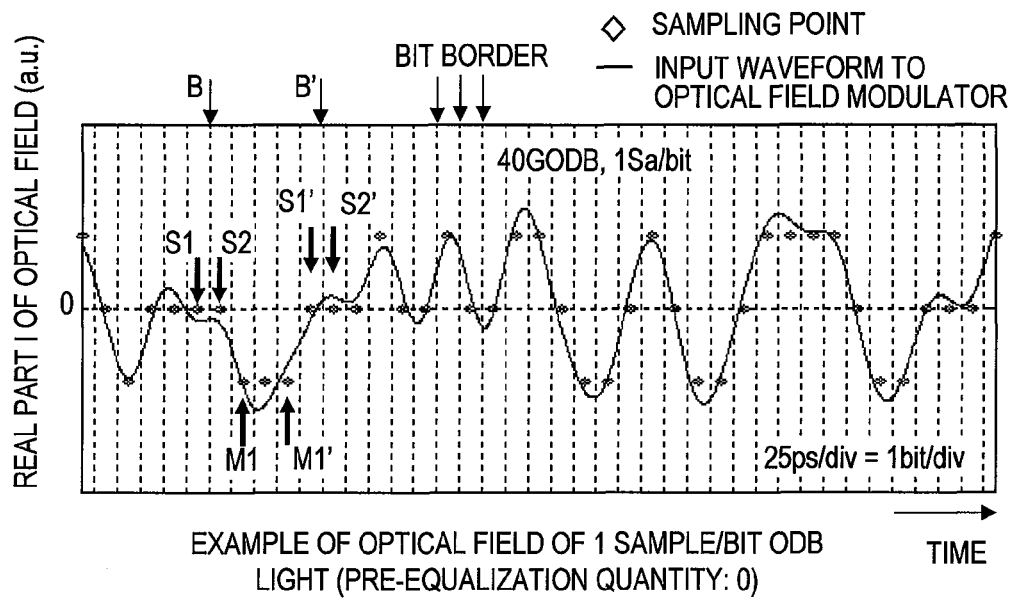
FIGS. 8A to 8C are explanatory diagrams each showing an operation of the 1 sample/bit optical duo-binary pre-equalization transmitter in accordance with the second embodiment of this invention.
Figure 8B:
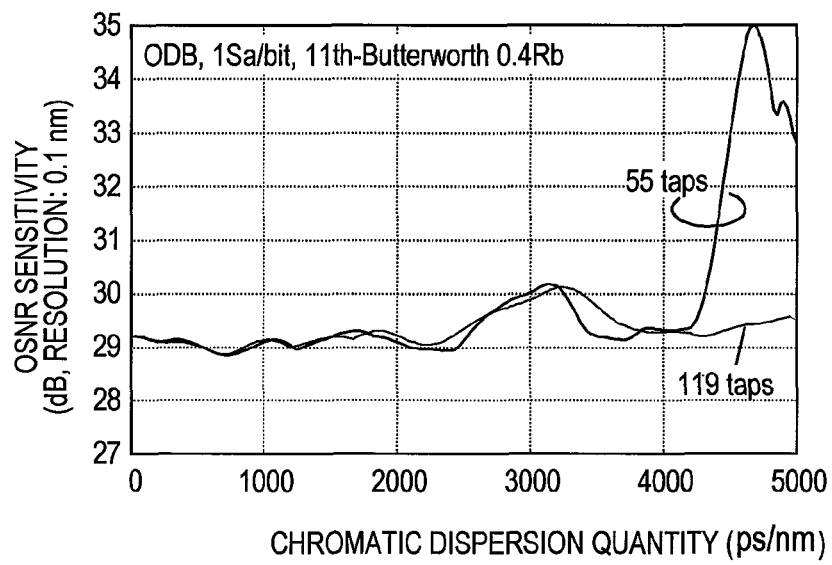
Figure 8C:
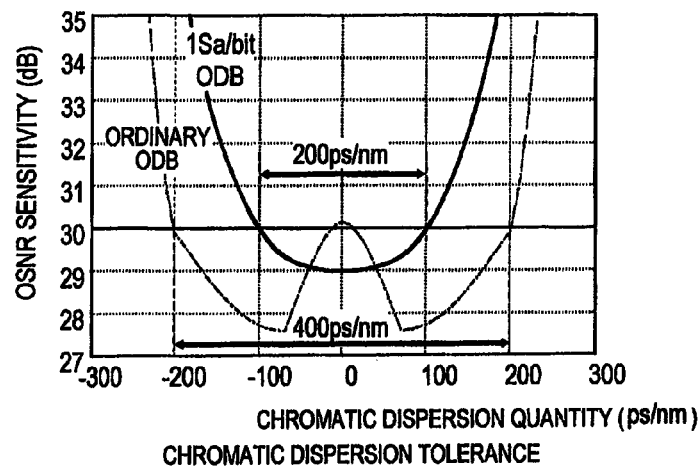

FIGS. 8A to 8C illustrate an operation of the 1 sample/bit optical duo-binary pre-equalization transmitter 100 according to the second embodiment of this invention.

An example illustrated in FIG. 8A illustrates an appearance of a generated optical duo-binary waveform. For the sake of understanding characteristics of the waveform, the real part of the optical field is illustrated when the pre-equalization quantity is zero (or after pre-equalization transmission). In the example illustrated in FIG. 8A, the pre-equalization quantity is zero, and, as a result, the imaginary part of the optical field becomes zero.

Vertical dotted lines represent time points at bit borders. The respective plotted points (•) are sampling points of a 1 sample/bit signal output from the pre-equalization circuit, and one plotted point exists at the center of each bit. A solid line represents an analog waveform input to the optical field modulator 110. The post-filter response equalizing filter 106 and the post filter 108-1 are not ideally operating, and hence the analog waveform is more or less displaced from the sampling points, but the analog waveform corresponds to the sampling points. The waveform in the solid line exhibits a characteristic of a duo-binary waveform, for example, the characteristic that a transition from a sampling point on the positive side to a sampling point on the negative side always routes through a sampling point with a zero amplitude.

The example illustrated in FIG. 8A is an example in which the respective signal processing circuits are realized for the 1 sample/bit configuration, thereby enhancing the efficiency of the signal processing. Especially, by causing the pre-equalization circuit 105 to operate for the 1 sample/bit signal, an effect of increasing the chromatic dispersion tolerance by four times is obtained, and when the pre-equalization circuit 105 has a margin in the operation speed and the like, an oversampling circuit may be inserted, thereby increasing the Nyquist bandwidth for realizing a part of the processing such as compensation for waveform degradation and equaqlization for time response.

Moreover, in order to reduce the operation speed of the D/A converters 107-1 and 107-2, the respective signal processing may be carried out for the 2 sample/bit configuration, and down-sampling may be carried out immediately before the D/A converters 107-1 and 107-2 for decreasing the conversion speed. This reduction in the operation speed does not influence the suppression of the leak rate of the signal and the like prescribed according to this embodiment.

Figure 1C:
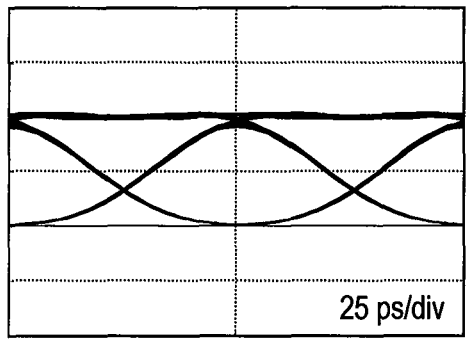
Figure 1D:
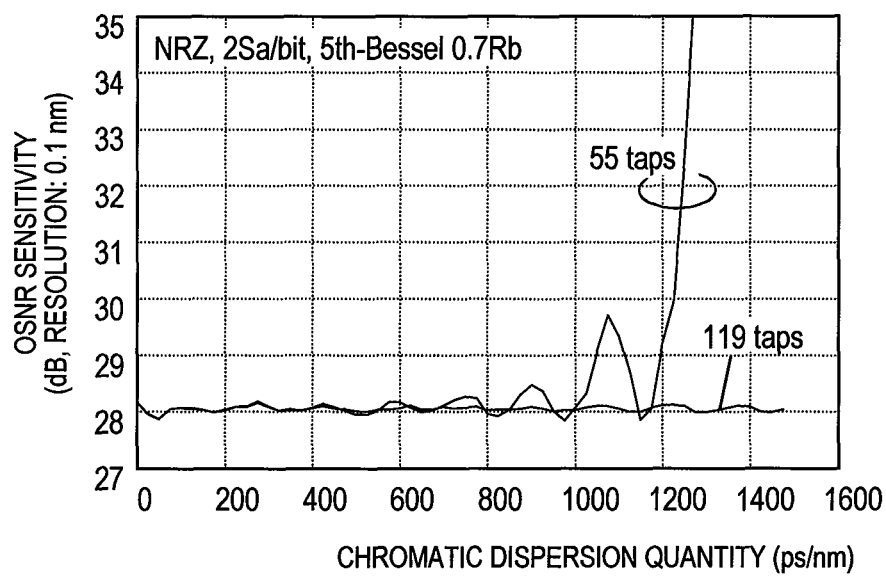
Figure 2:
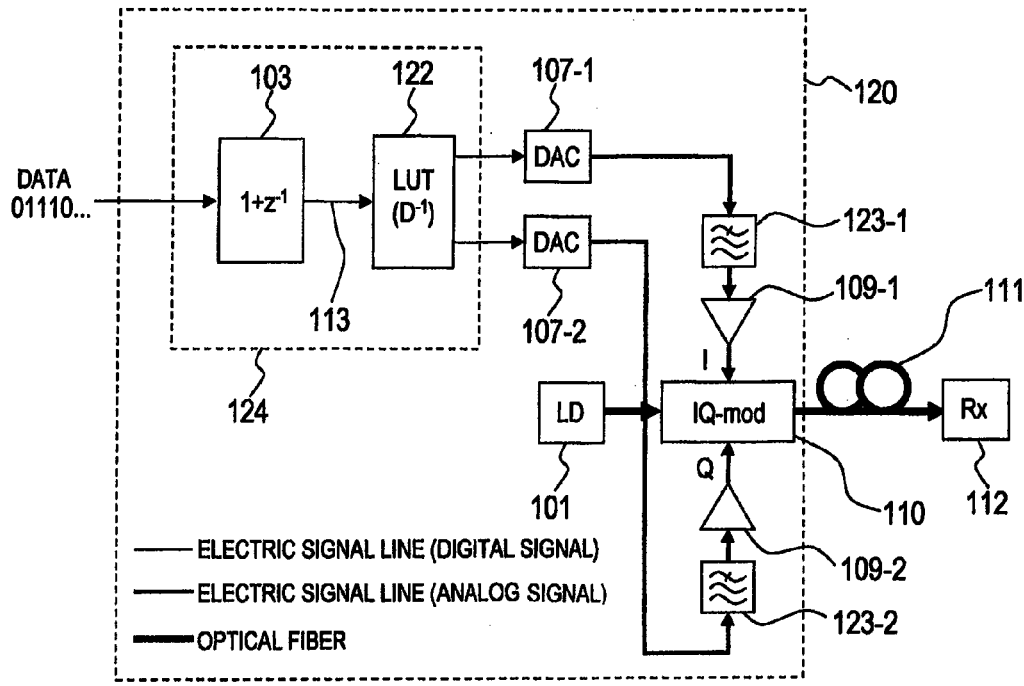
FIG. 2 is a block diagram showing a configuration of a conventional 1 sample/bit optical duo-binary pre-equalization transmitter.

FIG. 8B illustrates an example of results of confirmation of the pre-equalization transmission characteristic by numerical simulation, which is a relationship between the chromatic dispersion quantity and the OSNR penalty for pre-equalization transmission when the pre-equalization rate is 100%. In the example illustrated in FIG. 8B, for the pre-equalization circuit 105 employing a 55-stage FIR filter, pre-equalization transmission of 4,000 ps/nm is possible. This value is four times of the pre-equalization transmission of 2 sample/bit optical intensity modulation illustrated in FIG. 1C. In other words, this embodiment can realize, by employing the 1 sample/bit pre-equalization duo-binary method, the transmission distance four times as long as the conventional transmission distance with the same circuit scale.

Figure 10A:
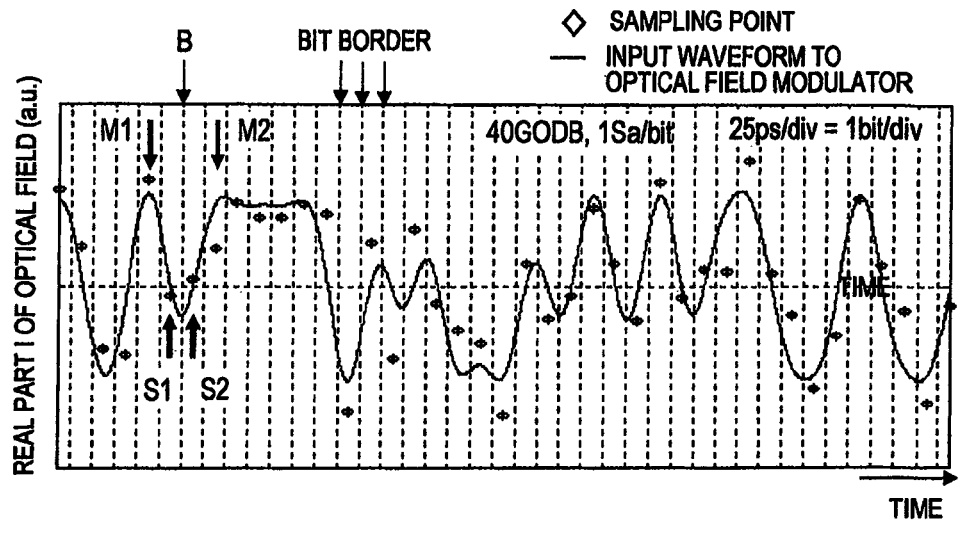
FIGS. 10A to 10D are explanatory diagrams each showing an operation of the 1 sample/bit optical duo-binary pre-equalization transmitter in accordance with the third embodiment of this invention.
Figure 10B:
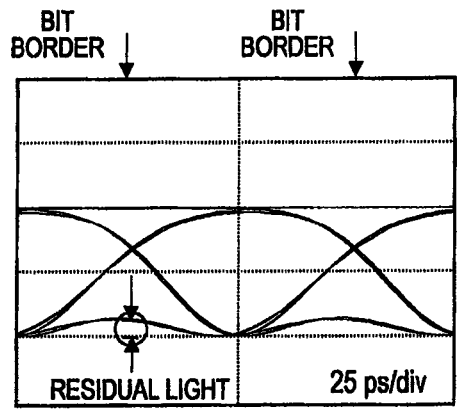

FIG. 8C illustrates an example of results of calculation of the chromatic dispersion tolerance for the above-mentioned 1 sample/bit pre-equalization duo-binary method with a transmission at 40 Gbit/s. A change in the OSNR sensitivity degradation (sensitivity prescribed by $BER=10^{-12}$) is calculated while the pre-equalization quantity is zero, and only the chromatic dispersion quantity in a transmission line is changed. As a result of the calculation, the chromatic dispersion tolerance (a range of the chromatic dispersion where 30 dB of the OSNR sensitivity is obtained) is 200 ps/nm. However, this value is approximately twice of that of the conventional pre-equalization transmission employing the binary optical intensity modulation, and, for an optical duo-binary signal generated in a analog manner, a width of 400 ps/nm is obtained as indicated by a dotted line of FIG. 8C. This is because the 1 sample/bit pre-equalization duo-binary signal according to the first and second embodiments of this invention does not provide an effect of increasing the chromatic dispersion tolerance due to optical interference. In other words, in the optical duo-binary waveform generated in the analog manner and conventionally widely used, the optical signal intensity does not become zero at a bit border, residual light thus always remains in the space portion, and it is known that an interference effect of the residual light (PSBT effect) increases the chromatic dispersion tolerance as illustrated in FIG. 10B. In other words, for a bit pattern in which two space portions and a mark portion successively exist, an optical field remains at a border between the two space portions, and the phase of the residual optical field is opposite in phase to that of the mark portion (the phase is displaced by 180 degrees), and hence an optical field of the mark portion extending to the space portions is cancelled by the interference effect, thereby reducing the influence of the chromatic dispersion.

On the other hand, in the example illustrated in FIG. 8A, for a bit pattern in which two space symbols S1 and S2 successively exist, and, then, a negative mark symbol M1 appears, residual light at the border between the space symbols S1 and S2 is small, and is identical in phase with the phase (negative) of the mark symbol M1. It should be noted that a space symbol indicates a sampling point with a zero amplitude, and a mark symbol indicates a sampling point with a predetermined amplitude.

As a result, an interference effect is not obtained, and when the mark symbol M1 spreads due to the chromatic dispersion, and reaches the space symbol S2, residual light cannot suppress the level of the space symbol S2 from rising. This holds true for a bit pattern including a mark symbol M1', a space symbol S1', and a space symbol S2', and, in this case, the interference effect is not obtained due to a weak optical signal at a border between the space symbols S1' and S2'. These phenomena cause the insufficient chromatic dispersion tolerance.

Third Embodiment

Figure 9:
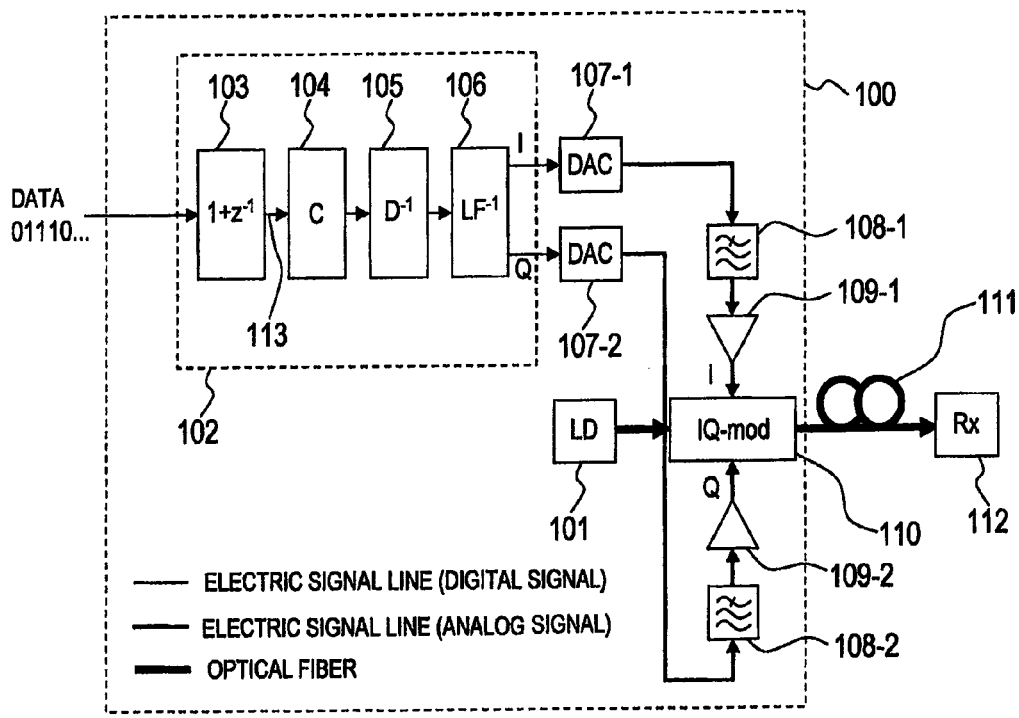
FIG. 9 is a block diagram showing a configuration of an optical transmission system in accordance with a third embodiment of this invention.

In order to solve the above-mentioned problem, FIG. 9 illustrates an example in which a waveform compensation circuit 104 is added to the 1 sample/bit optical duo-binary pre-equalization transmitter 100 according to the second embodiment.

The waveform compensation circuit 104 is constituted by an FIR filter, for example, and intentionally causes an optical interference effect in the 1 sample/bit pre-equalization duo-binary optical signal waveform by a bitwise operation, thereby increasing the chromatic dispersion tolerance.

The waveform compensation circuit 104 causes, in a bit pattern including three symbols in which a mark symbol M1 is disposed before or after two successive space symbols S1 and S2, the intensity of the optical field of the complex signal at a bit border point B between the space symbols S1 and S2 to be always non-zero, and inverts the phase of the bit border point B with respect to the phase of the mark symbol M1 (changes to a phase displaced by 180 degrees from the phase of the mark symbol M1). Specifically, for example, at the space symbol S1 following the mark symbol M1, the amplitude value of the complex field is set to a predetermined non-zero amplitude value, and the phase at the bit border point B is inverted with respect to the phase of the mark symbol M1. Further, digital signal processing is realized so as to obtain an output by setting, at a space symbol S2 preceding a positive or negative mark symbol M2, the amplitude value of the complex field to the predetermined non-zero amplitude value, and inverting the phase at the bit border point B with respect to the phase of the mark symbol M2. This processing realizes, in a space portion, a residual optical field having a phase opposite to the mark portion.

However, only one digital sampling point exists for one bit, and hence this digital signal processing sets the optical field at a time point at the center of any one of space portions to non-zero. Thus, according to this embodiment, the center of gravity of the optical signal is further moved through the digital signal processing, thereby moving the optical field of the residual light generated at the time point at the center of the space portion to the border of bits. According to this embodiment, this is realized by an operation carried out on preceding and following bits (operation of duo-binary pre-coding using—0.1*pat[p2]+1.1*pat[p1]+pat[i]−1, for example)

Figure 10C:
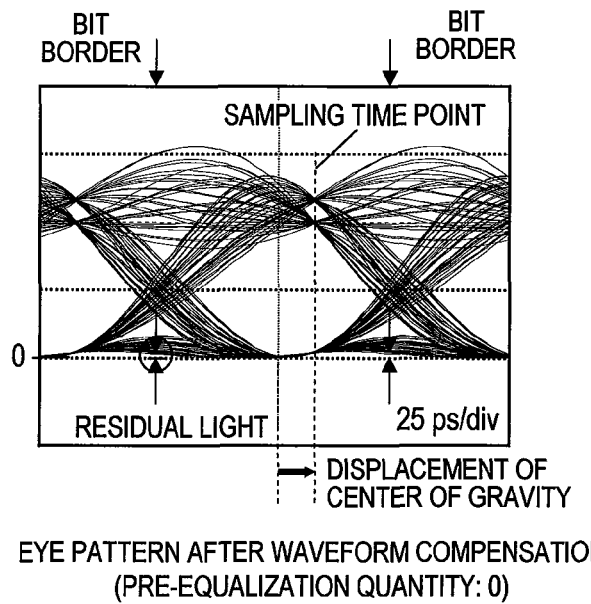

As a result, an output optical signal (optical signal with pre-equalization quantity of zero) takes a waveform illustrated in FIG. 10C, in which the optical intensity at a bit border is always non-zero. FIG. 10C illustrates an example of the optical field waveform after compensation of the waveform carried out by the waveform compensation circuit 104, in which the intensity of the optical signal is non-zero at borders of bits so that residual light thus exists, the phase of the residual light is inverted with respect to the phase of the mark portions, and the phase of the residual light between the above-mentioned successive space symbols S1 and S2 is inverted with respect to the phases of the neighboring mark symbols M1 and M2.

Figure 10D:
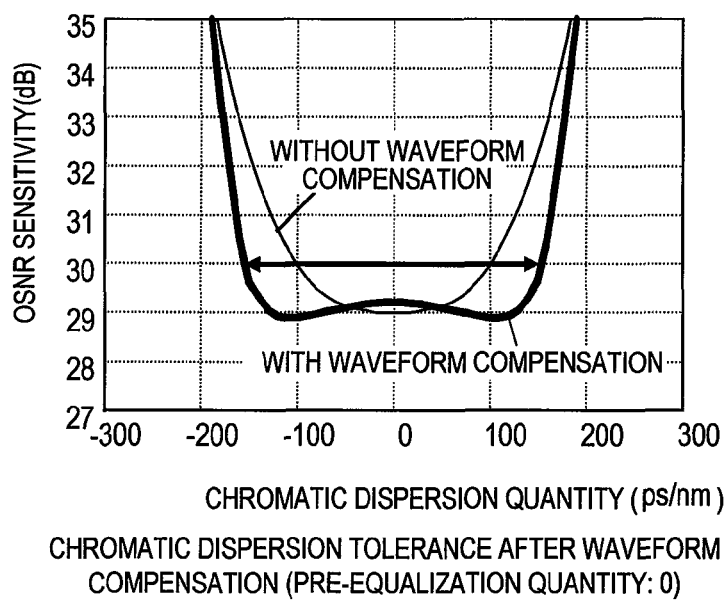

Consequently, the optical interference effect can be provided, and as illustrated in FIG. 10D, the chromatic dispersion tolerance can be improved by approximately 1.5 times to 300 ps/nm. It should be noted that the optical duo-binary transmission is linear optical transmission, and a part of the functions such as the waveform compensation circuit 104 may be moved to the reception side.

In the third embodiment of this invention, by employing the optical interference effect in the digital signal processing, the chromatic dispersion tolerance of the generated 1 sample/bit optical duo-binary signal can increase to approximately four times that of the NRZ signal. As a result, even when a measurement of the chromatic dispersion of a transmission line includes an error, or when the chromatic dispersion changes, the pre-equalization transmission can be provided, thereby eliminating superfluous configurations such as a variable CD compensation circuit.

Fourth Embodiment

Figure 11:
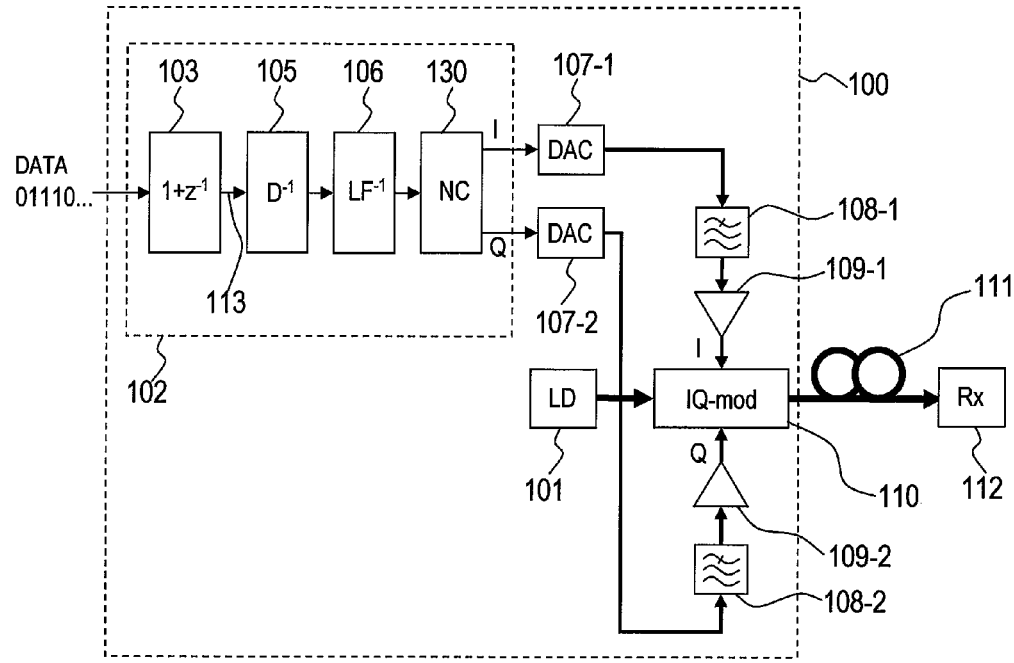
FIG. 11 is a block diagram showing a configuration of an optical transmission system in accordance with a fourth embodiment of this invention.

FIG. 11 illustrates a configuration of an optical transmission system according to a fourth embodiment of this invention. In the example illustrated in FIG. 11, in place of the waveform compensation circuit 104 according to the third embodiment, a 'non-linear phase' compensation circuit 130 is added.

The 'non-linear phase' compensation circuit 130 compensates degradation from fiber non-linearity (phase rotation) generated in an optical fiber through which a modulated optical field signal is transmitted.

The non-linear phase rotation generated in optical fiber transmission is a phenomenon in which a modulated optical field signal is degraded by an unnecessary non-linear phase rotation, which is generated, due to a non-linear effect (self-phase modulation effect) of the optical fiber, from an intensity modulation component of the modulated optical field signal and optical intensity noise released from a repeater or the like during the transmission through the optical fiber, and is added to the phase component of the modulated optical field signal. Especially, the intensity modulation component is proportional to an intensity component $\{r(t)\}^2$ of the modulated optical field signal, and thus, can be compensated by the 'non-linear phase' compensation circuit 130 provided on the transmission side or the reception side. In other words, the 'non-linear phase' compensation circuit 130 calculates a non-linear phase $(\omega(t)=C\{r(t)\}^2)$ using a non linear coefficient C, and carries out an operation of subtracting the calculated non-linear phase from the input complex optical field.

The non-linear coefficient C is not specifically described, but the 'non-linear phase' compensation circuit 130 may use, as the non-linear coefficient C, a fixed quantity, may include a compensation quantity control terminal, and may use a predicted value calculated from the input power to the optical fiber transmission line or the number of repeaters, for example, or may conduct feedback control so that transmission characteristics obtained on the reception side, such as the code error rate, are optimal.

In the fourth embodiment of this invention, by providing the 'non-linear phase' compensation circuit for compensating, in advance, the influence of the non-linear phase rotation on the transmission side, the influence of the pre-equalization and the degradation by the transmission line are cancelled therebetween, thereby enabling transmission through an optical fiber over a long distance, and compensating the non-linear effect without an increase in quantity of the digital signal processing. Moreover, even when the 'non-linear phase' compensation circuit increases the width of the signal spectrum, the post filters can certainly suppress the leak of the signal.

Fifth Embodiment

Figure 12:
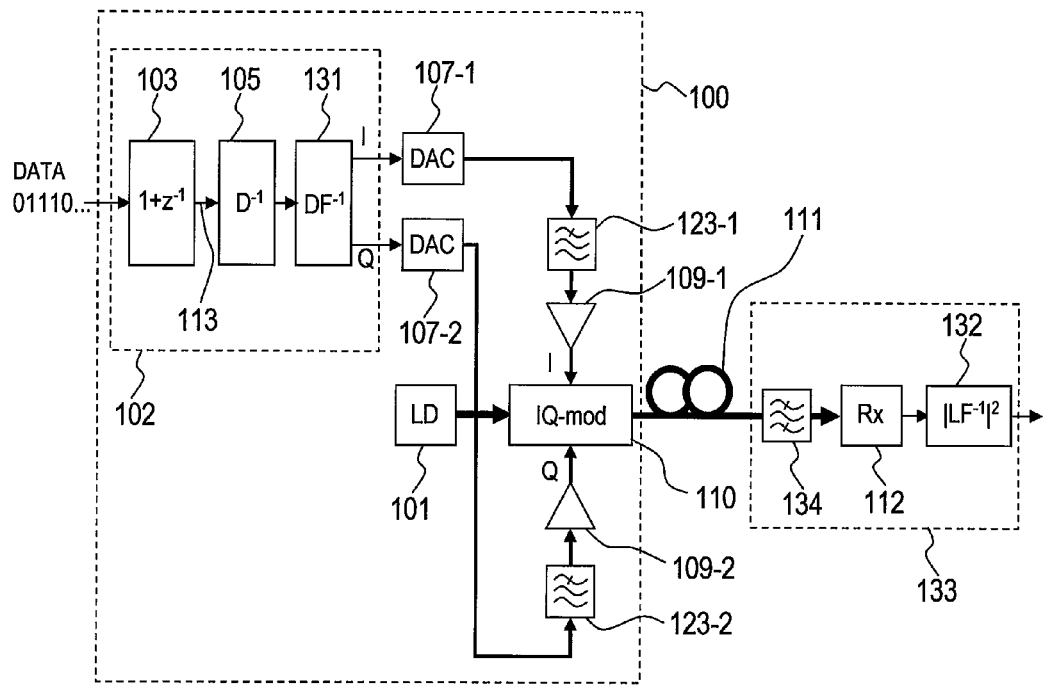
FIG. 12 is a block diagram showing a configuration of an optical transmission system in accordance with a fifth embodiment of this invention.

FIG. 12 illustrates a configuration of an optical transmission system according to a fifth embodiment of this invention.

In the example illustrated in FIG. 12, an optical receiver 133 includes a post-filter equalizing filter 132 for equalizing a degraded waveform on the reception side. Moreover, the 1 sample/bit pre-equalization optical duo-binary transmitter 100 includes a non-linear equalizing filter 131 for equalizing a non-linear response when the outputs of the driver circuits 109-1 and 109-2 are saturated and equalizing a modulation characteristic of the sinusoidal field amplitude of the optical field modulator 110.

The non-linear equalizing filter 131 can be easily realized in a table form for outputting, in response to a digital input voltage, a digital output voltage. The table can be constituted using a non-linear function or the like if necessary.

Moreover, in the example illustrated in FIG. 12, 4-th order Bessel filters 123-1 and 123-2 are used, but only the 4-th order Bessel filters 123-1 and 123-2 cannot suppress the signal leaking outside the Nyquist bandwidth by at least 23 dB. Thus, in the example illustrated in FIG. 12, the optical receiver 133 includes a narrow band-pass optical filter 134 realizing an optical filter which passes only a component within the Nyquist bandwidth extending from the center of the optical signal on both sides. This is filtering in the optical field domain, and is thus mathematically equivalent to filtering in the electrical domain using the above-mentioned post filter with a steep characteristic.

When the narrow band-pass optical filter 134 serves in place of the post filters with the steep characteristic, the post-filter equalizing filter 132 is preferably designed to equalize an equalized low-frequency response after a response of the narrow band-pass optical filter 134 is converted into the electric domain. Moreover, when electric filters such as the 4-th order Bessel filters 123-1 and 123-2 are used, the post-filter equalizing filter 132 preferably equalizes a response constituted by combining responses of the 4-th order Bessel filters 123-1 and 123-2, and the narrow band-pass optical filter 134.

It should be noted that the narrow band-pass optical filter 134 can be provided at any location between the output of the optical field modulator 110 and the optical receiver 112. For example, the narrow band-pass optical filter 134 may be provided inside the 1 sample/bit pre-equalization optical duo-binary transmitter 100, inside the optical receiver 133, or the like. Moreover, a filter for setting a transmission characteristic of an optical multiplexer/demultiplexer of a wavelength multiplex transmitter steep may be used as the narrow band-pass optical filter 134. Moreover, by combining responses of a plurality of filters inserted into a transmission line, narrow-band filtering may be realized.

As the narrow band-pass optical filter 134, an optical band-pass filter which has a fixed pass band may be used, and an optical filter which has a periodical passing characteristic meeting a wavelength grid (center wavelengths of spectra of an optical signal) or an optical filter variable in center wavelength or bandwidth is preferably used for setting a transmitted wavelength variable.

Sixth Embodiment

Figure 13:
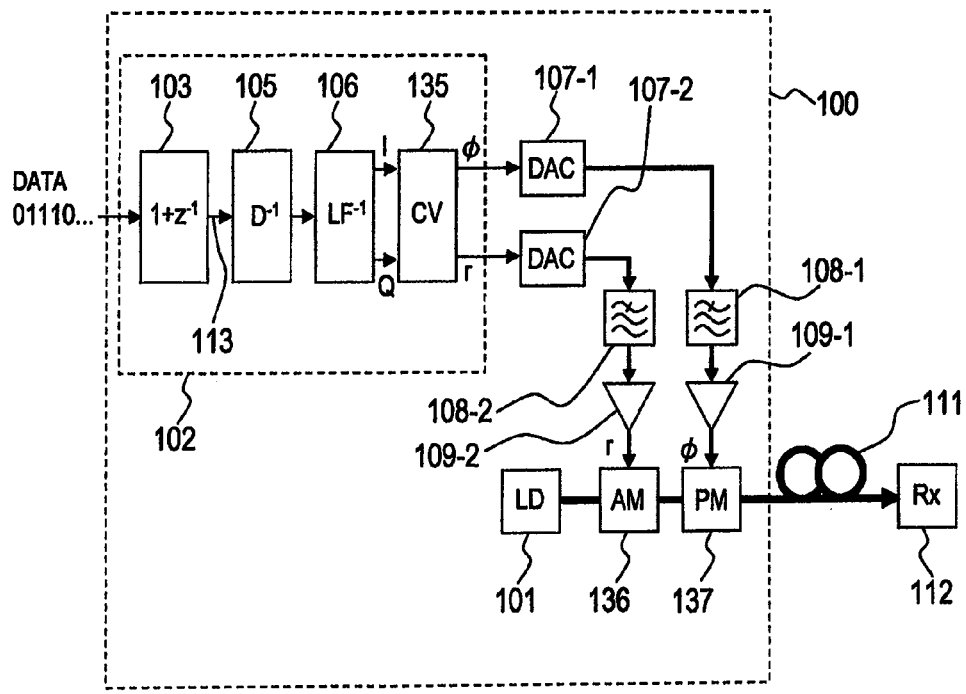
FIG. 13 is a block diagram showing a configuration of an optical transmission system in accordance with a sixth embodiment of this invention.

FIG. 13 illustrates a configuration of an optical transmission system according to a sixth embodiment of this invention, and the optical field modulator 110 is constituted by a tandem configuration including an optical amplitude modulator 136 and an optical phase modulator 137 without chirp.

In the example illustrated in FIG. 13, a polar coordinate conversion circuit 135 is used to convert the complex digital signal input from the post-filter equalizing filter 106 in the previous stage and represented in the orthogonal coordinate (IQ) into a signal represented in the polar coordinate (r, φ), and the r signal and the φ signal are respectively used as drive signals for the optical amplitude modulator 136 and the optical phase modulator 137 to thereby perform desired optical field modulation.

In the example illustrated in FIG. 13, the optical field modulator 110 is constituted by the combination of the optical amplitude modulator 136 and the optical phase modulator 137 without chirp, but theoretically, the optical field modulator 110 may be constituted by a combination of optical modulators having complex field modulation characteristics mutually independent of each other. For example, as the above-mentioned optical amplitude modulator 136, an optical amplitude modulator 136 having a frequency chirp (state in which the frequency temporally changes) may be used. Specifically, it is only necessary for the modulation to be carried out so as to cause the optical phase modulator 137 to cancel the frequency chirp component, and various modulators such as a semiconductor, an LN phase modulator, and an MZ modulator may be used. When the orthogonal modulation is not used, the cut characteristic and the shape required for the respective post filters 108-1 and 108-2 may change, but it is only necessary for any case to provide performance for suppressing the power of a signal leaking outside the Nyquist bandwidth in the optical field domain by at least 23 dB.

In the sixth embodiment of this invention, by causing the duo-binary precoder circuit to precode the two sets of information signals simultaneously into the in-phase component and the quadrature component of complex signals, the capacity for the information signal can be doubled without changing a circuit scale of the hardware. Moreover, the utility of the optical spectrum can be doubled, and thus, by decreasing the intervals between wavelengths used for the transmission by means of wavelength multiplexing, the transmission capacity using one optical fiber can be doubled.

Seventh Embodiment

Figure 14:
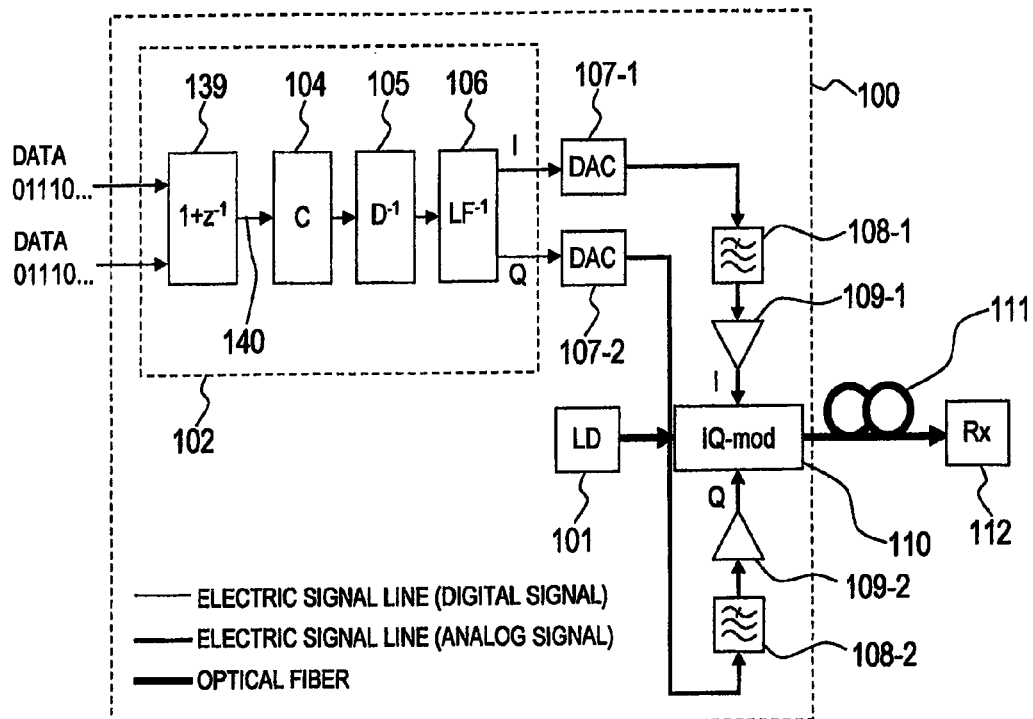
FIG. 14 is a block diagram showing a configuration of an optical transmission system in accordance with a seventh embodiment of this invention.

FIG. 14 illustrates a configuration of an optical transmission system according to a seventh embodiment of this invention, which is an example in which a complex multi-valued signal is modulated by the duo-binary modulation and is transmitted.

The above-mentioned embodiments are intended for transmission of the 1 sample/bit binary information signal. However, a general multi-valued signal can be converted into a duo-binary signal, and, according to the seventh embodiment, a duo-binary signal obtained from a 1 sample/symbol multi-valued signal is transmitted.

In the example illustrated in FIG. 14, two sets of binary information signals are input to a two-input orthogonal complex duo-binary precoder circuit 139. The two-input orthogonal complex duo-binary precoder circuit 139 generates a complex nine-valued duo-binary signal 140 in which the real part and the imaginary part of a field are independently modulated according to a ternary duo-binary code. A ternary duo-binary code is considered as a code obtained by duo-binarizing two-dimensional four-valued information (0, 0), (0, 1), (1, 0), and (1, 1).

The two-input orthogonal complex duo-binary precoder circuit 139 is configured to independently duo-binarize the two input information signals, and then, to output the real part and the imaginary part of the respective duo-binarized information signals. The complex information is input to the waveform compensation circuit 104, and hence, in the waveform compensation circuits 104, circuits for the real part and the imaginary part need to be provided in parallel. Similarly, in other signal processing circuits, circuits for the real part and the imaginary part need to be provided in parallel. In this way, the two sets of duo-binary signals generated independently for the in-phase component and the quadrature component of the complex digital signal pass the pre-equalization circuit 105 carrying out the complex operation, and are once mixed with each other, but the orthogonality of the in-phase component and the quadrature component is maintained, and hence the signal can be separated into the original signals after the optical fiber transmission.

The multi-valued signal handled by the seventh embodiment is not limited to the above-mentioned multi-valued signal, and a multi-valued signal may be a combination of the amplitude and the phase. The duo-binary pre-equalization transmission of the multi-valued signal can increase the optical spectrum utility. Moreover, the output light of the optical pre-equalization transmitter according to this embodiment may be multiplexed by polarization multiplexing, wavelength multiplexing, optical OFDM multiplexing, or the like. The multiplexing enables high-capacity transmission by increasing utility of the spectrum density and hardware.

While the present invention has been described in detail and pictorially in the accompanying drawings, the present invention is not limited to such detail but covers various obvious modifications and equivalent arrangements, which fall within the purview of the appended claims.

What is claimed is:

1. A pre-equalized optical transmitter, comprising:
    a laser source;
    a duo-binary pre-coder circuit;
    a pre-equalization circuit for applying an inverse function of chromatic dispersion;
    at least two D/A converters; and
    an optical field modulator comprising at least two input terminals for an electric signal,
    the pre-equalized optical transmitter being configured to:
    convert, by the duo-binary pre-coder circuit, a digital information signal of a predetermined symbol time to be transmitted into a digital complex signal including one sampling point per symbol;
    equalize, by the pre-equalization circuit, degradation in transmission of the digital complex signal, and input the digital complex signal equalized in terms of the degradation in transmission to the at least two D/A converters;
    convert, by the at least two D/A converters, the equalized digital complex signal into an analog signal;
    suppress, among the converted analog signals, an analog signal leaking outside a Nyquist bandwidth by at least 23 dB, and input the suppressed analog signal to the optical field modulator;
    modulate, by the optical field modulator, fight output from the laser source with the analog signal to generate a modulated optical field signal; and
    transmit the modulated optical field signal,
    wherein:
    the digital complex signal includes a space symbol indicating a sampling point with a zero amplitude, and a mark symbol indicating a sampling point with a predetermined amplitude; and
    the pre-equalized optical transmitter further comprises a waveform compensation circuit for changing a phase of a symbol border of two successive space symbols to a phase shifted by 180 degrees from a phase of the mark symbol in the case where the digital complex signal includes the mark symbol in one of before and after two successive space symbols.

2. The pre-equalized optical transmitter according to claim 1, further comprising a post filter,
wherein the post filter suppresses, among the converted analog signals, the analog signal leaking outside the Nyquist bandwidth by at least 23 dB.

3. The pre-equalized optical transmitter according to claim 2, wherein the post filter is selected from one of a Butterworth filter, an elliptic filter, and a Chebyshev filter, which are higher than a 5-th order.

4. The pre-equalized optical transmitter according to claim 2, further comprising a digital equalizing filter arranged on a previous stage of each of the at least two D/A converters, for equalizing a time response of the post filter.

5. The pre-equalized optical transmitter according to claim 2, further comprising an analog equalizing filter arranged on a subsequent stage of each of the at least two D/A converters, for equalizing a time response of the post filter.

6. The pre-equalized optical transmitter according to claim 1, wherein:
the waveform compensation circuit is configured to:
set an amplitude value of a complex field of a space symbol following the mark symbol to a non-zero predetermined amplitude value to change a phase of the space symbol following the mark symbol to the phase shifted by 180 degrees from the phase of the mark symbol in the case where the mark symbol is included before two successive space symbols; and
set an amplitude value of a complex field of a space symbol preceding the mark symbol to a non-zero predetermined amplitude value to change a phase of the space symbol preceding the mark symbol to the phase shifted by 180 degrees from the phase of the mark symbol following the space symbol in the case where the mark symbol is included after two successive space symbols.

7. The pre-equalized optical transmitter according to claim 1, wherein the waveform compensation circuit moves a center of gravity in terms of time of an optical field waveform of the digital complex signal in one of a forward direction and a backward direction before equalization of the degradation in transmission.

8. The pre-equalized optical transmitter according to claim 1, further comprising a non-linear phase compensation circuit for compensating a degradation from fiber non-linearity generated in an optical fiber through which the modulated optical field signal is transmitted.

9. The pre-equalized optical transmitter according to claim 1, wherein the duo-binary pre-coder circuit respectively converts two sets of input digital information signals into two sets of digital complex signals orthogonal to each other.

10. A pre-equalized optical transmission system, comprising:
a pre-equalized optical transmitter comprising:
a laser source;
a duo-binary pre-coder circuit;
a pre-equalization circuit for applying an inverse function of chromatic dispersion;
at least two D/A converters; and
an optical field modulator comprising at least two input terminals for an electric signal;
a narrow band-pass optical filter; and
a pre-equalized optical receiver for receiving a modulated optical field signal transmitted from the pre-equalized optical transmitter, wherein:
the duo-binary pre-coder circuit converts a digital information signal of a predetermined symbol time to be transmitted into a digital complex signal including one sampling point per symbol;
the pre-equalization circuit equalizes degradation in transmission of the digital complex signal, and inputs the digital complex signal equalized in terms of the degradation in transmission to the at least two D/A converters;
the at least two D/A converters convert the equalized digital complex signal into an analog signal, and input the converted analog signal into the optical field modulator;
the optical field modulator modulates light output from the laser source with the analog signal to generate the modulated optical field signal, and transmits the modulated optical field signal;
the narrow band-pass optical filter suppress, among the modulated optical field signals, an optical field signal leaking outside a Nyquist bandwidth by at least 23 dB; and
the pre-equalized optical receiver receives the suppressed optical field signal,
wherein:
the digital complex signal includes a space symbol indicating a sampling point with a zero amplitude, and a mark symbol indicating a sampling point with a predetermined amplitude; and
the pre-equalized optical transmitter further comprises a waveform compensation circuit for changing a phase of a symbol border of two successive space symbols to a phase shifted by 180 degrees from a phase of the mark symbol in the case where the digital complex signal includes the mark symbol in one of before and after two successive space symbols.

11. The pre-equalized optical transmission system according to claim 10, wherein the pre-equalized optical transmitter further comprises a digital equalizing filter arranged on a previous stage of each of the at least two D/A converters, for equalizing a time response of the narrow band-pass optical filter.

12. The pre-equalized optical transmission system according to claim 10, wherein the pre-equalized optical transmitter further comprises an analog equalizing filter arranged on a subsequent stage of each of the at least two D/A converters, for equalizing a time response of the narrow band-pass optical filter.

13. The pre-equalized optical transmission system according to claim 10, wherein:
the waveform compensation circuit is configured to:
set an amplitude value of a complex field of a space symbol following the mark symbol to a non-zero predetermined amplitude value to change a phase of the space symbol following the mark symbol to the phase shifted by 180 degrees from the phase of the mark symbol in the case of which the mark symbol is included before two successive space symbols; and
set an amplitude value of a complex field of a space symbol preceding the mark symbol to a non-zero predetermined amplitude value to change a phase of the space symbol preceding the mark symbol to the phase shifted by 180 degrees from the phase of the mark symbol in the case of which the mark symbol is included after two successive space symbols.

14. The pre-equalized optical transmission system according to claim 10, wherein the waveform compensation circuit moves a center of gravity in terms of time of an optical field waveform of the digital complex signal in one of a forward direction and a backward direction before equalization of the degradation in transmission.

15. The pre-equalized optical transmission system according to claim 10, wherein the pre-equalized optical transmitter further comprises a non-linear phase compensation circuit for compensating a degradation from fiber non-linearity generated in an optical fiber through which the modulated optical field signal is transmitted.

16. The pre-equalized optical transmission system according to claim 10, wherein the duo-binary pre-coder circuit respectively converts two sets of input digital information signals into two sets of digital complex signals orthogonal to each other.

17. The pre-equalized optical transmission system according to claim 10, wherein the pre-equalized optical receiver comprises an equalizing filter for equalizing a time response of a post filter.

* * * * *